(12) United States Patent
Sen et al.

(10) Patent No.: US 12,483,928 B2
(45) Date of Patent: Nov. 25, 2025

(54) METHOD AND USER EQUIPMENT FOR CONTROLLING PDCP AGGREGATION

(71) Applicant: SAMSUNG ELECTRONICS CO., LTD., Suwon-si (KR)

(72) Inventors: Arijit Sen, Bangalore (IN); Koustav Roy, Bangalore (IN); Ankur Pooniya, Bangalore (IN); Subhrodip Mazumdar, Bangalore (IN); Pratibha K Satyaganapati, Bangalore (IN); Manasi Ekkundi, Bangalore (IN); Jajohn Mathew Mattam, Bangalore (IN)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 370 days.

(21) Appl. No.: 18/088,116

(22) Filed: Dec. 23, 2022

(65) Prior Publication Data

US 2023/0209393 A1 Jun. 29, 2023

Related U.S. Application Data

(63) Continuation of application No. PCT/KR2022/020865, filed on Dec. 20, 2022.

(30) Foreign Application Priority Data

Dec. 23, 2021 (IN) .............................. 202141060318
Dec. 5, 2022 (IN) .......................... 2021 410 603 18

(51) Int. Cl.
*H04W 28/02* (2009.01)
*H04W 28/08* (2023.01)

(52) U.S. Cl.
CPC ... *H04W 28/0268* (2013.01); *H04W 28/0967* (2020.05)

(58) Field of Classification Search
CPC ......... H04W 28/0268; H04W 28/0967; H04W 76/15; H04W 28/02; H04W 28/08;
(Continued)

(56) References Cited

U.S. PATENT DOCUMENTS 11,324,060 B2 * 5/2022 Wang ..................... H04W 76/15
11,659,474 B2 * 5/2023 Kwok ................... H04W 76/15
370/329

(Continued)

FOREIGN PATENT DOCUMENTS

CN 112584550 3/2021
EP 3 768 038 1/2021

(Continued)

OTHER PUBLICATIONS

Extended Search Report dated Sep. 12, 2024 in European Patent Application No. 22911870.8.

(Continued)

*Primary Examiner* — Nathan S Taylor
(74) *Attorney, Agent, or Firm* — Nixon & Vanderhye, P.C.

(57) ABSTRACT

A method for controlling, by a user equipment (UE), PDCP aggregation in a dual connectivity mode includes receiving a first Uplink (UL) data threshold value from a network; monitoring a throughput of a UL data of the UE and occurrence of at least one UL channel condition, wherein the at least one UL channel condition includes at least one of a network condition and a UE condition; determining whether to perform a calculation of a second UL data threshold value based on the occurrence of the at least one UL channel condition; calculating the second UL data threshold value based on a plurality of network parameters and a plurality of UE parameters, based on determining to perform the calculation of the second UL data threshold value; comparing an (Continued)

amount of the UL data with the second UL data threshold value; and controlling PCDP aggregation based on a result of the comparison.

20 Claims, 19 Drawing Sheets

(58) Field of Classification Search
CPC ...... H04W 24/06; H04W 76/20; H04L 12/18; H04L 43/0876
USPC .......................................... 370/329
See application file for complete search history.

(56) References Cited

U.S. PATENT DOCUMENTS

| | | | |
|---|---|---|---|
| 2018/0124642 A1* | 5/2018 | Phuyal | H04W 88/10 |
| 2019/0223039 A1* | 7/2019 | Lee | H04W 76/27 |
| 2019/0253924 A1* | 8/2019 | Kim | H04W 28/0273 |
| 2019/0268799 A1* | 8/2019 | Hong | H04W 4/70 |
| 2019/0387561 A1* | 12/2019 | Paladugu | H04W 72/04 |
| 2020/0396643 A1* | 12/2020 | Kwok | H04W 28/0268 |
| 2021/0022032 A1* | 1/2021 | Kim | H04W 28/08 |
| 2021/0022206 A1* | 1/2021 | Kim | H04W 80/02 |
| 2021/0227606 A1* | 7/2021 | Liu | H04L 1/08 |
| 2021/0345454 A1* | 11/2021 | Dhanapal | H04W 76/27 |
| 2022/0086848 A1* | 3/2022 | Sharma | H04W 28/0268 |
| 2022/0217801 A1* | 7/2022 | Chang | H04W 76/15 |
| 2022/0386211 A1* | 12/2022 | Fu | H04W 40/02 |
| 2023/0164630 A1* | 5/2023 | Lin | H04W 28/0992 370/329 |
| 2023/0328582 A1* | 10/2023 | Zhang | H04W 24/08 370/235 |
| 2024/0072935 A1* | 2/2024 | Hong | H04L 5/0094 |
| 2024/0357693 A1* | 10/2024 | Zou | H04W 76/27 |

FOREIGN PATENT DOCUMENTS

| | | |
|---|---|---|
| WO | 2020/187997 | 9/2020 |
| WO | 2021/056168 | 4/2021 |

OTHER PUBLICATIONS

3GPP TS 38.323, Packet Data Convergence Protocol (PDCP) specification, Dec. 23, 2021, 40 pages.
3GPP TS 38.331,NR; Radio Resource Control (RRC); Protocol specification, Apr. 14, 2022, 964 pages.
3GPP TS 38.321, NR; Medium Access Control (MAC) protocol specification, Apr. 14, 2022, 159 pages.
3GPP TS 38.322 v.16.2.0 NR; Radio Link Control (RLC) protocol specification, Jan. 6, 2021, 33 pages.
R2-1710309,Dynamic leg switching for split/duplication bearer, Oct. 9, 2017, 3 pages.
Search Report dated Mar. 29, 2023 in International Patent Application No. PCT/KR2022/020865.
Written Opinion dated Mar. 29, 2023 in International Patent Application No. PCT/KR2022/020865.
Examination Report dated Nov. 30, 2023 in Indian Patent Application No. 202141060318 and English-language translation.

* cited by examiner

METHOD AND USER EQUIPMENT FOR CONTROLLING PDCP AGGREGATION

CROSS-REFERENCE TO RELATED APPLICATIONS

This application is a continuation of International Application No. PCT/KR2022/020865 designating the United States, filed on Dec. 20, 2022, in the Korean Intellectual Property Receiving Office and claiming priority to Indian Provisional Patent Application No. 202141060318 filed on Dec. 23, 2021, in the Indian Patent Office, and Indian Complete Patent Application No. 202141060318 filed on Dec. 5, 2022, in the Indian Patent Office, the disclosures of each of which are incorporated by reference herein in their entireties.

BACKGROUND

Field

The disclosure generally relates to wireless communication, and more specifically relates to a method and a User Equipment (UE) for controlling Packet Data Convergence Protocol (PDCP) aggregation.

Description of Related Art

In general, Dual Connectivity (DC) is a Long-Term Evolution (LTE) feature that allows aggregation of two radio links with non-ideal backhaul without requiring low latency. To accomplish this, the two-radio links are aggregated at a PDCP layer, which combines PDCP Protocol data units (PDUs). A fundamental principle of a split bearer in DC is one PDCP with two RLC entities. The split bearer uses the Radio Link Control (RLC) layer, Medium Access Control (MAC) layer, and Physical layer within both a Master Node (MN) and a Secondary Node (SN). There will be one RLC entity for LTE and one RLC entity for New Radio (NR), and the RLC Service Data Units (SDUs) from both will aggregate at the PDCP layer. This is known as PDCP aggregation.

FIG. 1 illustrates existing Uplink (UL) PDCP aggregation for E-UTRAN New Radio-Dual Connectivity (EN-DC). In the case of the split bearer, a network (e.g., base station, E-UTRAN Node B (eNodeB), etc.) will configure an Up-Link (UL) data split threshold in RRC reconfiguration for a UE. According to 3GPP Technical Specification (TS) 38.323, the UE submits (11) a PDCP PDU/sends UL data to either a primary RLC entity (i.e., NR RLC)/a primary channel/a primary leg or a secondary RLC entity (i.e., LTE RLC)/a secondary channel/a secondary leg when the total amount of PDCP data volume and RLC data volume pending for initial transmission (as specified in 3GPP TS 38.322) in two associated RLC entities (i.e., NR RLC, LTE RLC) is equal to or larger than the UL data split threshold. The UE submits (10) the PDCP PDU/sends UL data to the primary RLC entity when the total amount of PDCP data volume and RLC data volume pending for initial transmission in the associated RLC entity is lower than the UL data split threshold. FIG. 2 illustrates existing UL PDCP aggregation for NR-NR-Dual Connectivity (NR-DC). According to 3GPP Technical Specification (TS) 37.340, NG-RAN supports the NR-DC, which involves connecting the UE to one gNB that serves as the MN and another gNB that serves as the SN. Furthermore, the NR-DC can be used when the UE is connected to two gNB-DUs, one serving a Master Cell Group (MCG) and the other serving a Secondary Cell Group (SCG), both of which are connected to the same gNodeB Centralized Unit (gNB-CU) and act as both the MN and the SN. According to 3GPP Technical Specification (TS) 38.323, the UE submits (21) the PDCP PDU/sends UL data to either a primary RLC entity (i.e., NR2 RLC) or a secondary RLC entity (i.e., NR1 RLC) when the total amount of PDCP data volume and RLC data volume pending for initial transmission (as specified in 3GPP TS 38.322) in two associated RLC entities (i.e., NR1 RLC, NR2 RLC) is equal to or larger than the UL data split threshold. The UE submits (20) the PDCP PDU/sends UL data to the primary RLC entity when the total amount of PDCP data volume and RLC data volume pending for initial transmission in the associated RLC entity is lower than the UL data split threshold.

The existing PDCP aggregation has some limitations. For example, when the amount of uplink data PDU fluctuates around the UL data split threshold configured by the network, the UE keeps switching back and forth between the primary and secondary legs. Many factors can contribute to this situation(s), including (a) currently running applications in the foreground and background, (b) signal condition of the primary leg, i.e., whether the UE is under a bad signal condition, or the number of retransmissions is causing PDCP buffer data to increase, obstruction, particularly in the case of NR (Millimetre wave (MM wave)) as the primary leg, and so on, (c) current Tx power, (d) DPS feature, (e) Maximum Possible Tx Power Level (MTPL) values configured, and so on. Under this situation(s), based on the network configuration, the following two conditions are possible:

a. NR is set as the primary leg: the UE must switch to LTE or LTE+NR leg in the UL, and b. LTE is set as the primary leg: the UE must switch to NR or LTE+NR leg in the UL.

Furthermore, if the amount of data is just above the UL data split threshold, the UE may send the UL data in both legs. And if the amount of UL data fluctuates above and below the UL data split threshold, the UL PDCP aggregation/UL leg will fluctuate as well. This type of PDCP Aggregation fluctuation can result in higher power consumption because both Tx are used at the same time, and in these cases, the primary leg may be sufficient to meet data transfer requirements. Furthermore, in the case of a low battery scenario, it will result in extremely high battery consumption.

FIG. 3 illustrates a problem scenario of early thermal mitigation triggering due to frequent UL PDCP aggregation fluctuation, according to the prior art. The UE detects (30) the UL data to transfer the network. The UE then determines (31) whether the UL data is above or below the UL data split threshold in response to detecting the UL data to transfer. The UE performs (32) the UL PDCP aggregation in response to determining that the UL data is above the UL data split threshold. As a result, the temperature of the UE may increase (33) as the UE uses the primary leg and the secondary leg simultaneously to transfer the UL data to the network. The UE sends (34) the UL data to the network by utilizing the primary leg in response to determining that the UL data is below the UL data split threshold. As a result, the temperature of the UE may increase moderately (35). If the UL data is frequently going above and below the UL data split threshold, the UE must keep switching its radio (e.g., from LTE to LTE+NR or NR to LTE+NR and vice versa). Because the UE must transmit on both of its radios, its temperature will rapidly rise. As a result, the UE is forced to use thermal mitigation earlier and more frequently. Because of the thermal mitigation, the UE will lose the NR or reduce its data speed (for a longer period of time) due to the increased signalling overhead for adding and removing the NR, which can be avoided. The situation deteriorates when the UE is either at the NR cell edge, the LTE cell edge, or both. It will force the UE to transmit data at maximum power, causing thermal mitigation to occur faster.

Additionally, the existing PDCP aggregation has another limitation, such as packet drops caused by UL leg switches when Dynamic Power Sharing (DPS) is enabled. If UL data is above the UL data split threshold, the UE may transmit in both radios (e.g., from LTE to LTE+NR or NR to LTE+NR and vice versa). During data transfer, the UE may be required to use a dynamic power-sharing method between two radios (e.g., LTE+NR). As a result, the UE will be forced to reduce or limit its Tx power on both the existing and new legs (e.g., primary, or secondary leg). UL data packets may be unable to reach the network due to dynamic power sharing and/or reduced Tx power. As a result, the UE will have to retransmit the majority of the UL data packets that did not reach the network. As a result, UL throughput will suffer, as will packet loss or UL data stalling. It may also cause DL data stalling if the UE is unable to send DL packet acknowledgments to the network for the same reason. When the UE is either at the NR cell edge, the LTE cell edge, or both, the situation can deteriorate. Finally, packet loss or retransmission may require the UE or network to declare Radio Link Failure (RLF) in one or both legs (e.g., primary, or secondary leg). If the type/amount of data does not necessitate the UL split (sending data in both legs), but the UE still chooses to split the data in the UL, this may result in unnecessary failures and transmission delays.

FIG. 4 illustrates another problem scenario of temporary UL data stall caused by frequent UL leg switch (ping pong), according to the prior art. In general, the UE receives a UL leg switch indication/notification (40) from the network via, for example, an RRC message, or in some other scenario, and the UE sends the UL leg switch indication/notification (42 and 44) to the network via, for example, RRC message. The UE then sends an RRC reconfigure complete indication/notification (41 and 43) to the network in response to receiving the UL leg switch indication/notification (40) or sending the UL leg switch indication/notification (42). In case of fluctuating UL channel conditions, the network will keep on changing UL leg via RRC Reconfiguration or MAC control channel messages. In this condition, if the UE keeps on switching its leg it might lead to race conditions and leg changing frequently, resulting in temporary or permanent data stalling (4X) in the UL.

Additionally, the existing PDCP aggregation has another limitation, such as unnecessary or delayed UL PDCP aggregation. If the UL data volume exceeds the UL data split threshold, the UE will transmit in both radios (e.g., from LTE to LTE+NR or NR to LTE+NR and vice versa), but it is possible that the current UL primary leg can handle data volume greater than the UL data split threshold, for example, because the network has set a very low UL data split threshold, current channel conditions are very good, and so on. The UE will transmit data on both legs unnecessarily, which will degrade UE performance due to (a) early thermal mitigation (b) faster battery drainage (c) capped Tx power in the case of Dynamic Power Sharing, which may cause UL data to drop, and so on. Furthermore, if the primary UL leg channel conditions deteriorate (e.g., high BLER, Retx), but the UL data is less than the UL data split threshold, the UE will continue to transmit data over the primary leg only until the UE can improve throughput using UL PDCP aggregation. Furthermore, even if the primary leg is unable to serve UL data requests from the AP layer, the UE will not use UL PDCP aggregation, resulting in poor uplink performance and a poor user experience.

Thus, it is desired to address the above-mentioned disadvantages or other shortcomings or at least provide a useful alternative for controlling PDCP aggregation in wireless communication.

The existing PDCP aggregation has limitations, examples of which are listed below:

a. If the network does not configure an optimal value for the UL data split threshold, the UE may end up performing PDCP aggregation too early or not performing PDCP aggregation at all if the primary leg/channel is insufficient. This could result in increased Tx power, battery consumption, and temperature rise in the UE.

b. If the primary UL channel conditions deteriorate (e.g., high Block Error Rate (BLER), Retx), but the UL data is below the UL data split threshold, the UE will continue to transmit UL data over the primary UL channel only until the UE can improve throughput using UL PDCP aggregation. Even if the primary UL channel is unable to serve UL data requests from an AP layer, the UE will not use UL PDCP aggregation, resulting in poor UL performance and a poor user experience.

c. If the amount of UL data fluctuates around the UL data split threshold (within a buffer), the UE may send UL data on both legs. In such cases, using the secondary leg when the primary leg is sufficient may result in increased power and battery consumption in the UE.

d. If the UE at the NR or LTE cell edge continuously enables PDCP aggregation or does not fully utilize the better UL path, the UE may hit NR Thermal earlier and lose NR connectivity for a prolonged period of time due to higher TX power utilization.

e. Where higher TX power is required to send UL data/packets and DL acknowledgments to the network at the NR or LTE cell edge, a Dynamic Power Saving (DPS) feature may prevent the UE from using full TX capability (in dual UL transmission), resulting in high retransmissions and data stalls.

f. If the UL channel condition keeps changing, the network will continue to change the UL leg via RRC Reconfiguration or MAC control channel messages. If the UE continues to switch its leg in this condition, it may cause race conditions and frequent leg switching, resulting in temporary or permanent data stalling in the UL.

Thus, it would be desirable to address the above-mentioned disadvantages or other shortcomings or at least provide a useful alternative for controlling PDCP aggregation in wireless communication.

SUMMARY

This summary is provided to introduce a selection of concepts, in a simplified format, that are further described in the detailed description. This summary is neither intended to identify key or essential concepts of the disclosure nor is it intended for determining the scope of the disclosure.

According to an embodiment of the present disclosure, a method for controlling, by a user equipment (UE), Packet Data Convergence Protocol (PDCP) aggregation in a dual connectivity mode includes receiving a first Uplink (UL) data threshold value from a network; monitoring a throughput of a UL data of the UE and an occurrence of at least one UL channel condition, where the at least one UL channel condition includes at least one of a network condition and a UE condition; determining whether calculation of a second UL data threshold value is required based on the occurrence of at least one of the network condition or the UE condition; calculating the second UL data threshold value based on a plurality of network parameters, and a plurality of UE parameters in response to determining that calculation of the second UL data threshold value is required; comparing an amount of the UL data with the second UL Data threshold value; and controlling the PCDP aggregation based on a result of the comparison.

According to an embodiment of the present disclosure, a user equipment for controlling the PDCP aggregation in a dual connectivity mode includes a memory and a processor coupled to the memory. The processor is configured to receive first UL data threshold value from a network; monitor the throughput of the UL data of the UE and occurrence of the at least one UL channel condition, wherein the at least one UL channel condition includes at least one of a network condition and a UE condition; determine whether calculation of the second UL data threshold value is required based on occurrence of the at least one UL channel condition; calculate the second UL data threshold value based on a plurality of network parameters, and a plurality of UE parameters in response to determining that calculation of the second UL data threshold value is required; compare the amount of the UL data with the second UL Data threshold value; and control the PCDP aggregation based on a result of the comparison.

According to an embodiment of the present disclosure, a non-transitory computer readable storage medium storing instructions which, when executed by a processor of a user equipment (UE) causes the UE to execute operations, the operations comprising receiving a first Uplink (UL) data threshold value from a network; monitoring a throughput of a UL data of the UE and occurrence of at least one UL channel condition, wherein the at least one UL channel condition includes at least one of a network condition and a UE condition; determining whether to perform a calculation of a second UL data threshold value based on the occurrence of the at least one UL channel condition; calculating the second UL data threshold value based on a plurality of network parameters and a plurality of UE parameters, based on determining to perform the calculation of the second UL data threshold value; comparing an amount of the UL data with the second UL data threshold value; and controlling the PCDP aggregation based on a result of the comparison.

To further clarify the advantages and features of the disclosure, a more particular description will be rendered by reference to specific embodiments thereof, which are illustrated in the appended drawings. It is appreciated that these drawings depict only non-limiting example embodiments of the disclosure and are therefore not to be considered limiting of its scope. The disclosure will be described and explained with additional specificity and detail in the accompanying drawings.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
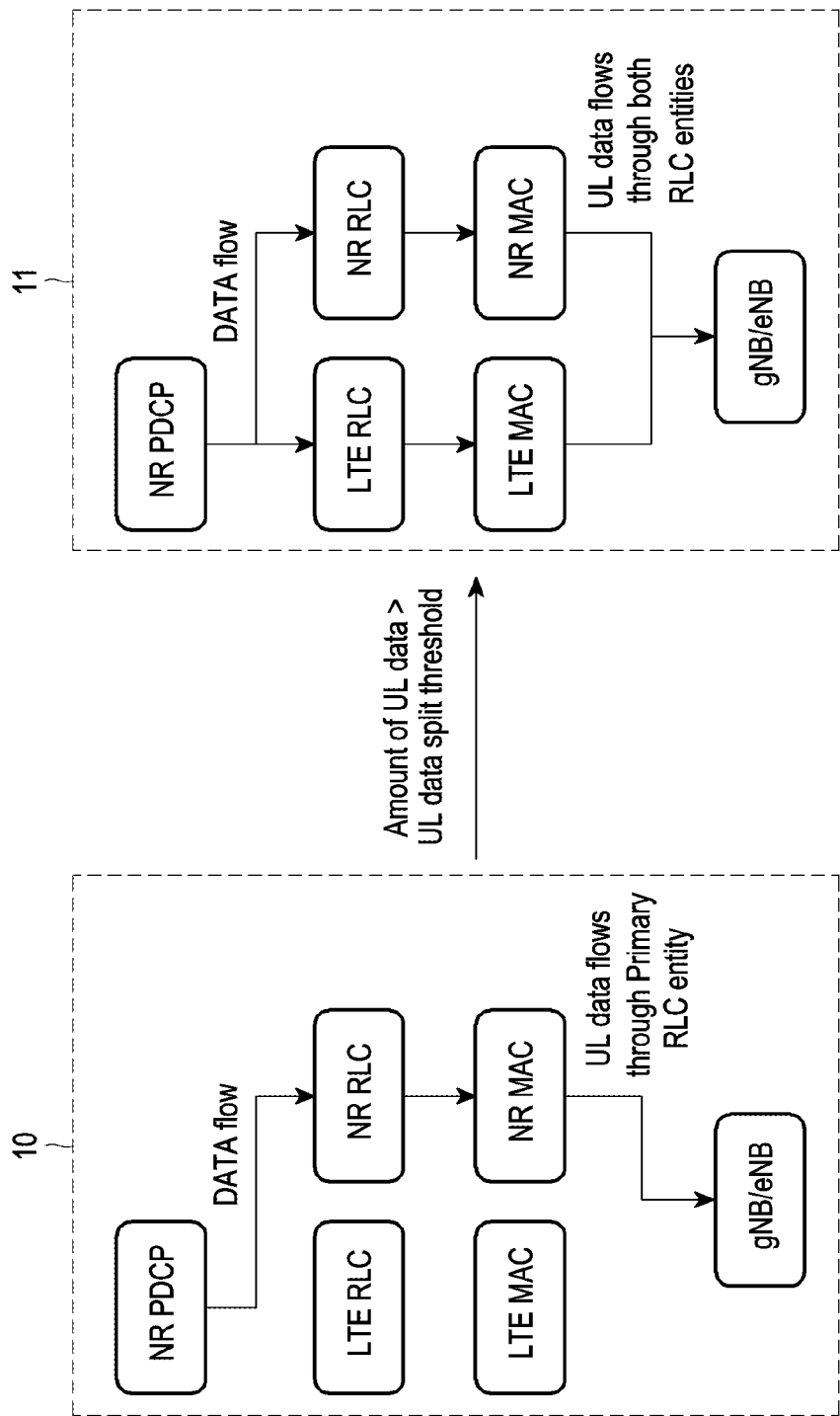
FIG. 1 illustrates existing Uplink (UL) Packet Data Convergence Protocol (PDCP) aggregation for E-UTRAN New Radio-Dual Connectivity (EN-DC), according to the prior art.
Figure 2:
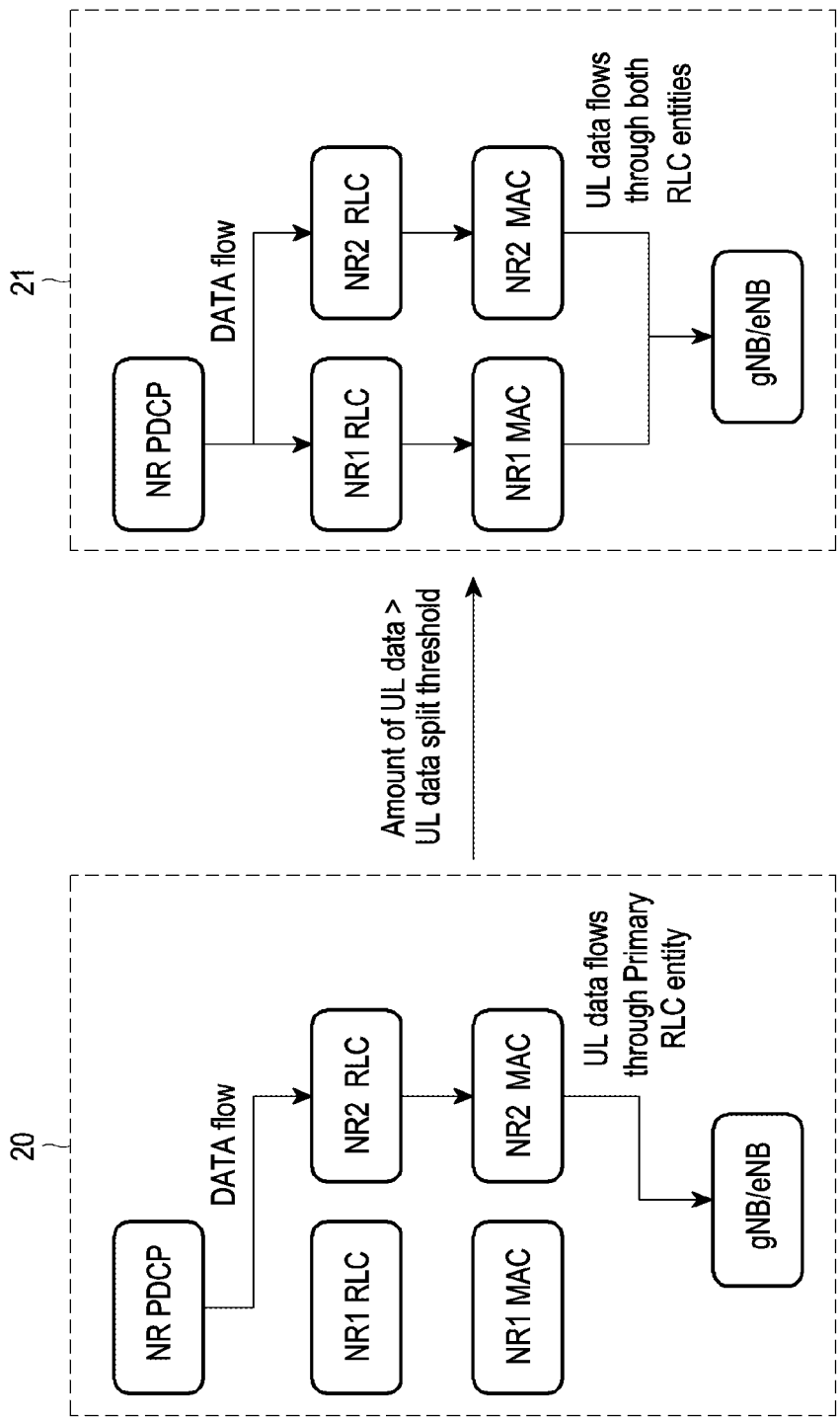
FIG. 2 illustrates existing UL PDCP aggregation for NR-NR-Dual Connectivity (NR-DC), according to the prior art.
Figure 3:
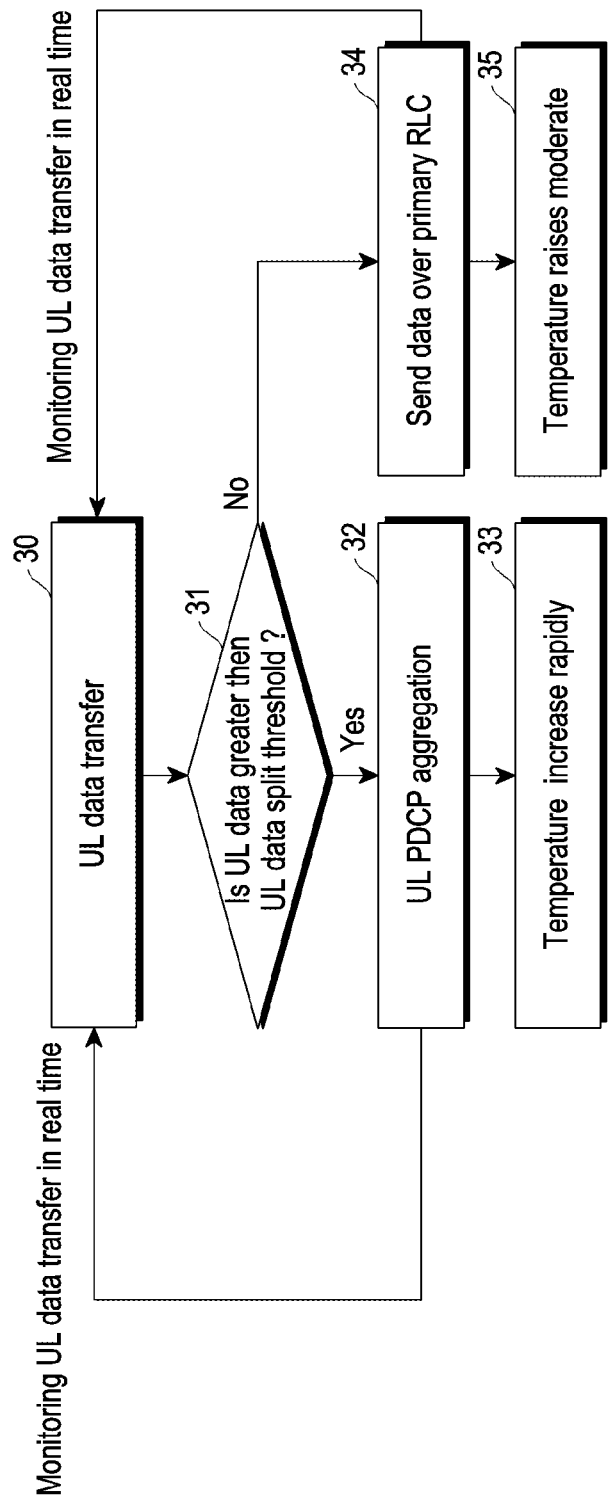
FIG. 3 illustrates a problem scenario of early thermal mitigation triggering due to frequent UL PDCP aggregation fluctuation, according to the prior art.
Figure 4:
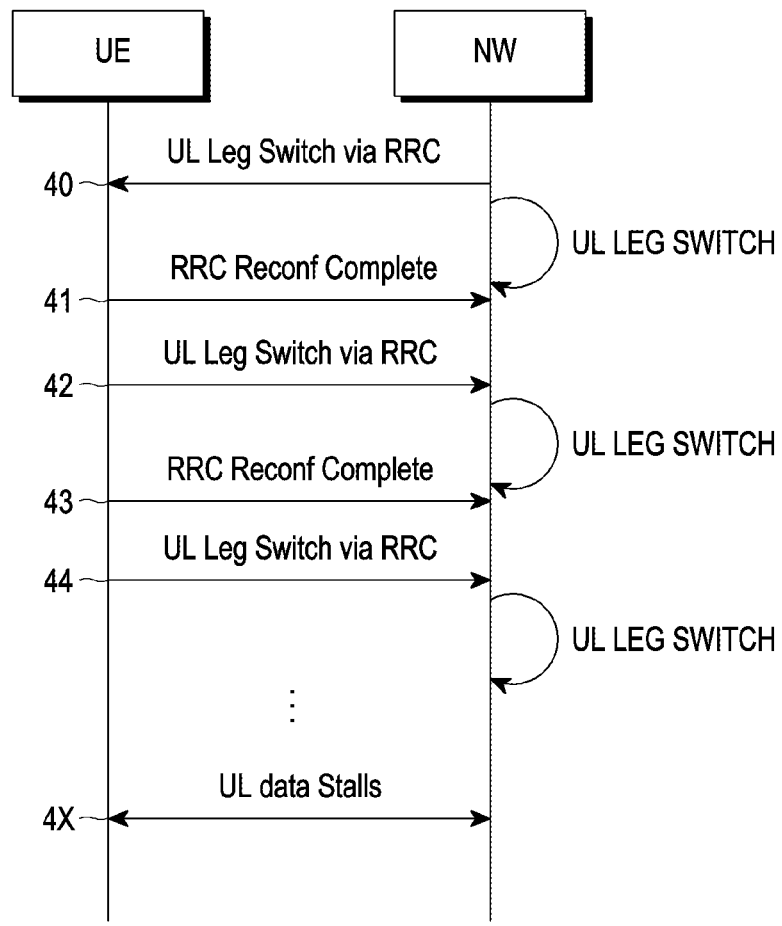
FIG. 4 illustrates another problem scenario of temporary UL data stall caused by frequent UL leg switch (ping pong), according to the prior art.

Further, skilled artisans will appreciate that elements in the drawings are illustrated for simplicity and may not have necessarily been drawn to scale. For example, the flow charts illustrate the method to help to improve understanding of aspects of the present disclosure. Furthermore, in terms of the construction of the device, one or more components of the device may have been represented in the drawings by conventional symbols, and the drawings may show only those specific details that are pertinent to understanding the embodiments of the present disclosure so as not to obscure the drawings with details that will be readily apparent to those of ordinary skill in the art having the benefit of the description herein.

DETAILED DESCRIPTION

For the purpose of promoting an understanding of the principles of the disclosure, reference will now be made to various non-limiting example embodiments illustrated in the drawings and specific language will be used to describe the same. It will nevertheless be understood that no limitation of the scope of the disclosure is thereby intended, and the disclosure includes such alterations and further modifications in the illustrated system, and such further applications of the principles of the disclosure as illustrated therein as would normally occur to one skilled in the art to which the disclosure relates.

It will be understood that the foregoing general description and the following detailed description are explanatory of the disclosure and are not intended to be restrictive thereof.

Reference throughout this specification to "an aspect," "another aspect" or similar language means that a particular feature, structure, or characteristic described in connection with an example embodiment is included in at least one embodiment of the present disclosure. Thus, appearances of the phrase "in an embodiment," "in another embodiment," and similar language throughout this specification may, but do not necessarily, all refer to the same embodiment.

The terms "comprise", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures or components proceeded by "comprises . . . a" does not, without more constraints, preclude the existence of other devices or other sub-systems or other elements or other structures or other components or additional devices or additional sub-systems or additional elements or additional structures or additional components.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various example embodiments described herein are not necessarily mutually exclusive, as some embodiments can be combined with one or more other embodiments to form new embodiments. The term "or" as used herein, refers to a non-exclusive or unless otherwise indicated. The examples used herein are intended merely to facilitate an understanding of ways in which the embodiments herein can be practised and to further enable those skilled in the art to practice the embodiments herein. Accordingly, the examples should not be construed as limiting the scope of the embodiments herein.

As is traditional in the field, embodiments may be described and illustrated in terms of blocks that carry out a described function or functions. These blocks, which may be referred to herein as units or modules or the like, are physically implemented by analog or digital circuits (or combinations thereof) such as logic gates, integrated circuits, microprocessors, microcontrollers, memory circuits, passive electronic components, active electronic components, optical components, hardwired circuits, or the like, and may optionally be driven by firmware and software (or combinations thereof). The circuits may, for example, be embodied in one or more semiconductor chips, or on substrate supports such as printed circuit boards and the like. The circuits in a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure The accompanying drawings are used to help easily understand various technical features and it should be understood that the embodiments presented herein are not limited by the accompanying drawings. As such, the present disclosure should be construed to extend to any alterations, equivalents, and substitutes in addition to those which are particularly set out in the accompanying drawings. Although the terms first, second, etc. may be used herein to describe various elements, these elements should not be limited by these terms. These terms are generally only used to distinguish one element from another.

Throughout this disclosure, the terms "primary leg," "primary path," "primary channel" and "primary UL leg" are used interchangeably and can refer to the same. The terms "secondary leg," "secondary path," "secondary channel" and "secondary UL leg" are used interchangeably and can refer to the same. The terms "PDCP aggregation," and "UL aggregation" are used interchangeably and can refer to the same.

According to an embodiment of the present disclosure, a method for controlling Packet Data Convergence Protocol (PDCP) aggregation in a dual connectivity mode (e.g., LTE connection and NR connection) of a User Equipment (UE) includes receiving, by the UE, a first Uplink (UL) data threshold value from a network; monitoring, by the UE, a throughput of a UL data of the UE, and an occurrence of at least one UL channel condition, where the at least one UL channel condition includes a network condition and a UE condition; determining, by the UE, whether calculation of a second UL data threshold value is required based on occurrence of at least one of the network condition or the UE condition; calculating, by the UE, the second UL data threshold value based on a plurality of network parameters and a plurality of UE parameters in response to determining that calculation of the second UL data threshold value is required; comparing, by the UE, an amount of the UL data with the second UL Data threshold value; and controlling, by the UE, the PCDP aggregation based on a result of the comparison.

According to an embodiment of the present disclosure, an electronic device for controlling PDCP aggregation in a dual connectivity mode includes a channel optimizer coupled with a processor and a memory. The channel optimizer is configured to receive first UL data threshold value from a network; monitor throughput of UL data of the UE and occurrence of at least one UL channel condition, wherein the at least one UL channel condition includes a network condition and a UE condition; determine whether the calculation of the second UL data threshold value is required based on occurrence of the at least one UL channel condition; calculate a second UL data threshold value based on a plurality of network parameters, and a plurality of UE parameters in response to determining that the calculation of the second UL data threshold value is required; compare an amount of the UL data with the second UL data threshold value; and control PCDP aggregation based on a result of the comparison.

Referring now to the drawings, and more particularly to FIGS. 5 through 19, where similar reference characters denote corresponding features consistently throughout the figures, there are shown non-limiting example embodiments.

Figure 5:
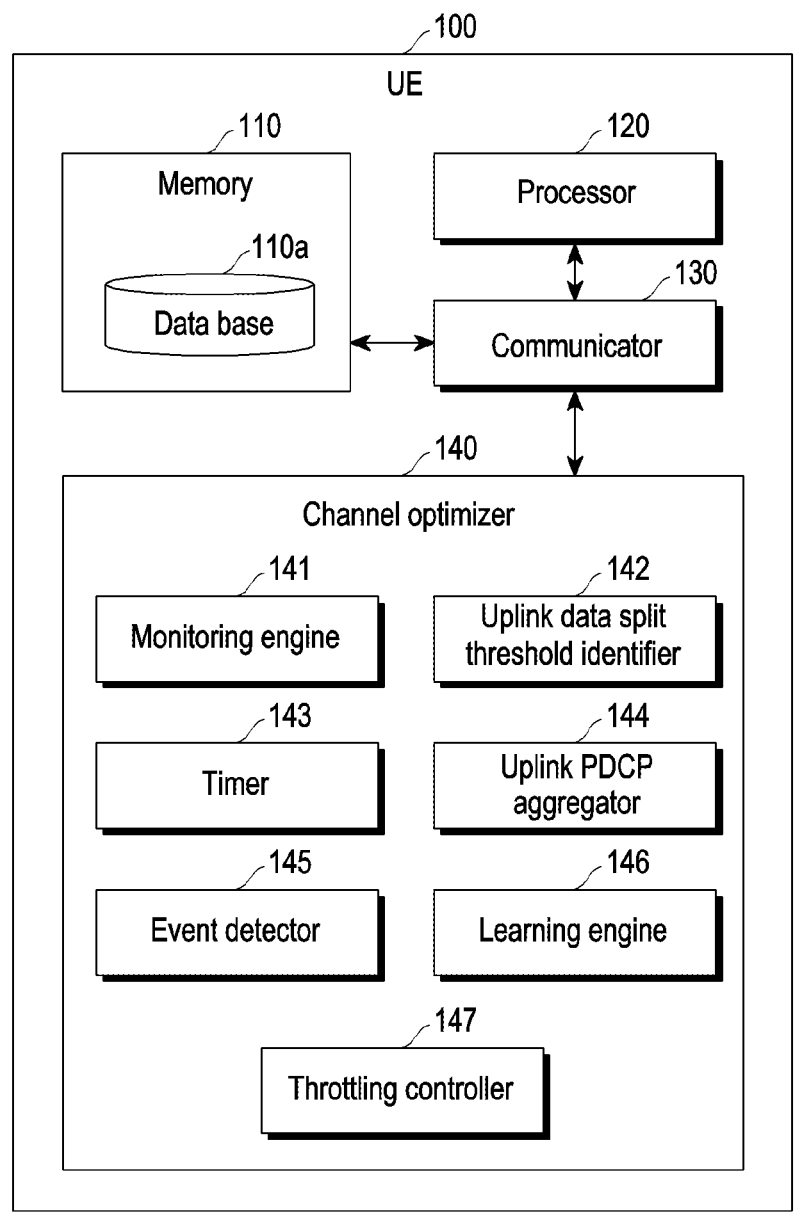
FIG. 5 illustrates a block diagram of an example User Equipment (UE) for controlling PDCP aggregation in wireless communication, according to various embodiments.

FIG. 5 illustrates a block diagram of User Equipment (UE) (100) for controlling PDCP aggregation in wireless communication, according to an embodiment. Examples of the UE (100) include, but are not limited to, a smartphone, a tablet computer, a Personal Digital Assistance (PDA), an Internet of Things (IoT) device, a wearable device, etc.

In an embodiment, the UE (100) includes a memory (110), a processor (120), a communicator (130), and a channel optimizer (140).

In an embodiment, the memory (110) stores a plurality of parameters in a database (110a) of the memory (100). Examples of the plurality of parameters include, but are not limited to, UL data throughput, UL channel conditions, lower layer (RLC/PHY layer) throughput, UL data split threshold (or said dynamic UL data split threshold), network configured parameter (e.g., number of UL carriers, BW per carrier, max modulation scheme per carrier, max supported UL layer per carrier, Subcarrier Spacing (SCS) per carrier,), dynamic UL parameter (e.g., UL Retx and BLER, Power, MTPL and PHR in UL, signal condition (Reference Signal Received Power (RSRP)/Reference Signal Received Quality (RSRQ)/Signal-to-Noise Ratio (SNR)), path loss per carrier, configured UL BW part, timer value (T_TPUT_MONITOR), thermal mitigation threshold, Tx power threshold, current temperature level, current battery level, and CP indication. The memory (110) stores instructions to be executed by the processor (120). When the instructions are executed by the processor (120), the instructions may cause the UE (100) or the processor (120) to execute operations of the UE (100) or the processor (120) described herein. The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In various examples, the memory (110) can be configured to store larger amounts of information than the memory. In certain examples, a non-transitory storage medium may store data that can, over time, change (e.g., in Random Access Memory (RAM) or cache). The memory (110) can be an internal storage unit, or it can be an external storage unit of the UE (100), a cloud storage, or any other type of external storage.

The processor (120) (e.g., including processing circuitry) communicates with the memory (110), the communicator (130), and the channel optimizer (140). The processor (120) is configured to execute instructions stored in the memory (110) and to perform various processes. The processor (120) may include one or a plurality of processors, a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (130) (e.g., including communication circuitry) is configured for communicating internally between internal hardware components and with external devices (e.g., server) via one or more networks (e.g., radio technology). The communicator (130) includes an electronic circuit specific to a standard that enables wired or wireless communication.

The channel optimizer (140) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like. The channel optimizer (140) and the processor (120) may be integrally referred to as at least one processor.

In an embodiment, the channel optimizer (140) is implemented as at least one software module stored in the memory (110). The functions and operations of the channel optimizer (140) may be substantially implemented by the processor (120) executing related program codes.

In an embodiment, the channel optimizer (140) includes a monitoring engine (141), an uplink data split threshold identifier (142), a timer (143), an uplink PDCP aggregator (144), an event detector (145), a learning engine (146), and a throttling controller (147).

In an embodiment, the monitoring engine (141) receives a first Uplink (UL) data threshold value (i.e., UL data split threshold) from a network (e.g., base station, eNB, gNB, server, etc.). Furthermore, the monitoring engine (141) monitors a throughput of UL data of the UE (100), an amount of UL data of the UE (100), occurrence of at least one UL channel condition, where the at least one UL channel condition includes a network condition and a UE condition. The uplink data split threshold identifier (142) determines whether calculation of a second UL data threshold value (i.e., a new UL data split threshold) is to be performed or is required based on occurrence of the at least one UL channel condition. The uplink data split threshold identifier (142) then calculates the second UL data threshold value based on a plurality of network parameters (e.g., network-configured UL parameters, dynamic UL parameters, etc.), and a plurality of UE parameters (e.g., battery, temperature, Tx power)

in response to determining that the calculation of the second UL data threshold value to be performed or is required. The first UL data threshold value and the second UL data threshold value indicate limits in the amount of UL data for controlling the PDCP aggregation and the amount of UL data configured to flow through one of a primary leg or a secondary leg of an NR RLC entity and an LTE RLC entity. The uplink PDCP aggregator (144) compares the amount of the UL data with the second UL data threshold value. Furthermore, the uplink PDCP aggregator (144) controls the PCDP aggregation based on a result of the comparison.

In an embodiment, the uplink PDCP aggregator (144) disables the PCDP aggregation based on the result of the comparison that indicates that the amount of the UL data is less than the second UL data threshold value.

In an embodiment, the monitoring engine (141) monitors a throughput variation in lower layers until expiration a time period (e.g., a predefined time period) of a timer (143). The uplink PDCP aggregator (144) enables PCDP aggregation based on the determination that throughput variation is stable. PCDP aggregation is enabled when the amount of UL data is more than the second UL data threshold value.

In an embodiment, the uplink data split threshold identifier (142) recalculates the second UL data threshold value based on the determination that throughput variation is unstable after expiration of the predefined time period of the timer (143). The uplink data split threshold identifier (142) then obtains a third UL data threshold value (i.e., a new UL data split threshold) with respect to the second UL data threshold value based on the recalculation.

In an embodiment, the monitoring engine (141) determines occurrence of a poor UL channel condition, as the network condition, on the primary leg of one of the NR RLC entity or the LTE RLC entity based on the monitoring of the UL channel condition, throughput variation in the lower layers, and a data requirement in upper layers. The uplink data split threshold identifier (142) then calculates the second UL data threshold value lower with respect to the first UL data threshold value based on the determination of the occurrence of the poor channel condition. The uplink PDCP aggregator (144) then compares the amount of the UL data with the second UL data threshold value. The uplink PDCP aggregator (144) then enables PCDP aggregation based on a result of comparison that indicates that the amount of UL data is more than the second UL data threshold value. The uplink PDCP aggregator (144) then aggregates the amount of the UL data over both the primary and the secondary leg of one of the NR RLC entity and the LTE RLC entity after the enablement of PCDP aggregation. The uplink PDCP aggregator (144) then sends a dummy BSR to the network on the primary leg.

In an embodiment, the monitoring engine (141) determines at least one of an improvement in the UL channel condition, the data required in the upper layers, and throughput variation in the lower layers. The uplink data split threshold identifier (142) then recalculates the second UL data threshold value to increase the second UL data threshold value to the first UL data threshold value based on the determination of improvement of the UL channel condition, the data required in the upper layers, and the throughput variation in the lower layers.

In an embodiment, the monitoring engine (141) monitors a plurality of UE parameters including at least one of an available Power Headroom Report (PHR) in the primary leg of one of the NR RLC entity or the LTE RLC entity, a transmission power (Tx power) of the UE (100), or a Maximum Transmission Power Level (MPTL) in the primary leg. The monitoring engine (141) then determines occurrence of a UE condition indicating that the transmission power of the UE (100) is greater than the MPTL in the primary leg based on a comparison of the transmission power of the UE (100) with the MPTL in the primary leg. The uplink data split threshold identifier (142) then calculates the second UL data threshold value (UL dynamic threshold) to decrease with respect to the first UL data threshold value based on the determination of the occurrence of the UE condition indicating that the transmission power of the UE (100) is greater than the MPTL in the primary leg.

In an embodiment, the monitoring engine (141) determines occurrence of a UE condition indicating that the transmission power of the UE (100) is less than the MPTL in the primary leg based on the comparison of the transmission power of the UE (100) with the MPTL in the primary leg. The monitoring engine (141) then determines the available power headroom (PHR) in the primary leg is high based on the determination of the occurrence of the UE condition indicating that the transmission power of the UE (100) is less than the MPTL in the primary leg, where the available power headroom in the primary leg being high indicates that the UE (100) is allowed to transmit with a transmission power greater than a current transmission power. The uplink data split threshold identifier (142) then calculates the second UL data threshold value (UL dynamic threshold) to increase with respect to the first UL data threshold value based on the determination the available power headroom in the primary leg is high.

In an embodiment, the monitoring engine (141) determines the available power headroom in the primary leg is low based on the determination of occurrence of a UE condition indicating that the transmission power of the UE (100) is close to the MPTL in the primary leg, where the available power headroom in the primary leg being low indicates at least one of a condition including the UE (100) is not allowed to transmit with much higher the transmission power. The uplink data split threshold identifier (142) then calculates the second UL data threshold value (UL dynamic threshold) to decrease with respect to the first UL data threshold value based on the determination the available power headroom in the primary leg is low.

In an embodiment, the uplink data split threshold identifier (142) determines a UL data split ratio during PDCP aggregation based on available power headroom, current transmission power of the UE (100), and/or MTPL in the primary leg and a secondary leg. The monitoring engine (141) then determines whether the available power headroom is high on the primary leg or in the secondary leg, where the UL data split ratio is higher on one of the primary leg or the secondary leg based on a result of determination.

In an embodiment, the event detector (145) determines whether an ongoing service is related to a voice call. The event detector (145) determines whether the ongoing service is provided over the primary leg in response to determining that the determination that the ongoing service is related to the voice call. The uplink data split threshold identifier (142) calculates the second UL data threshold value to increase with respect to the first UL data threshold value based on the determination that the ongoing service is provided over the primary leg, where the second UL data threshold value is calculated to decrease with respect to the first UL data threshold value based on the determination that the ongoing service is not provided over the secondary leg.

In an embodiment, the monitoring engine (141) measures the plurality of UE parameters including at least one of a thermal mitigation temperature value configured in the UE (100), a current temperature of the UE (100), an ambient temperature at a particular instant of time, an average temperature increase caused due to an NR transmission at a current NR signal condition, or an average temperature increase caused due to LTE transmission at a current LTE signal condition. The monitoring engine (141) then sends, as an input, the plurality of UE parameters into a machine learning (ML) model (i.e., learning engine (146)). The learning engine (146) then predicts a thermal mitigation threshold value based on the inputted plurality of UE parameters. The learning engine (146) then updates the second UL data threshold value based on the predicted thermal mitigation threshold value, where PCDP aggregation is controlled, by the uplink PDCP aggregator (144), based on the updated second UL data threshold value.

In an embodiment, the monitoring engine (141) measures the plurality of UE parameters including at least one of the MTPL on the primary leg, a transmission power at a current leg, and/or a required transmission power of another leg based on the current signal condition of another leg. The monitoring engine (141) then sends, as an input, the plurality of UE parameters into the learning engine (146). The learning engine (146) then predicts a transmission power threshold value based on the inputted plurality of UE parameters. The learning engine (146) then updates the second UL data threshold value based on the predicted transmission power threshold value, where PCDP aggregation is controlled, by the uplink PDCP aggregator (144), based on the updated second UL data threshold value.

In an embodiment, the uplink data split threshold identifier (142) updates a buffer status report (BSR) report based on a determined UL data split ratio, where the UE (100) indicates a required amount of UL data in the BSR report after applying the determined UL data split ratio into a current amount of UL data.

In an embodiment, the monitoring engine (141) determines a fluctuation in the UL data with respect to a determined second UL data threshold value based on the monitored throughput UL data. The uplink data split threshold identifier (142) then calculates a third UL data threshold value (UE implementation specific value/delta) for adding to the second UL data threshold value based on at least one of the determinations of the requirement of the second UL data threshold value or the monitored throughput UL data, determined fluctuation. The uplink data split threshold identifier (142) then adds the calculated third UL data threshold value to the second UL data threshold value.

In an embodiment, the monitoring engine (141) receives an indication to throttle UL data based on determining a fluctuation in the UL data. The throttling controller (147) then throttles the UL data based on reception of the indication.

In an embodiment, the uplink data split threshold identifier (142) updates the plurality of UE parameters based on determining a fluctuation in the UL data, where the plurality of UE parameters includes at least one of a CQI report, a buffer status report (BSR), an available power headroom in a primary leg of one of the NR RLC entity and the LTE RLC entity, the transmission power of the UE (100), or the MPTL in the primary leg (MPTL)

A function associated with the various hardware components of the UE (100) may be performed through the non-volatile memory, the volatile memory, and the processor (120). One or a plurality of processors controls the processing of the input data in accordance with a predefined operating rule or AI model stored in the non-volatile memory and the volatile memory. The predefined operating rule or AI model is provided through training or learning. Here, being provided through learning means that, by applying a learning algorithm to a plurality of learning data, a predefined operating rule or AI model of the desired characteristic is made. The learning may be performed in a device itself in which AI according to an embodiment is performed, and/or may be implemented through a separate server/system. The learning algorithm is a method for training a predetermined target device (for example, a robot) using a plurality of learning data to cause, allow, or control the target device to decide or predict. Examples of learning algorithms include, but are not limited to, supervised learning, unsupervised learning, semi-supervised learning, or reinforcement learning.

The AI model may include a plurality of neural network layers. Each layer has a plurality of weight values and performs a layer operation through a calculation of a previous layer and an operation of a plurality of weights. Examples of neural networks include, but are not limited to, convolutional neural network (CNN), deep neural network (DNN), recurrent neural network (RNN), restricted Boltzmann Machine (RBM), deep belief network (DBN), bidirectional recurrent deep neural network (BRDNN), generative adversarial networks (GAN), and deep Q-networks.

Although FIG. 5 shows various hardware components of the UE (100), it is to be understood that the disclosure is not limited in this respect. In various embodiments, the UE (100) may include less or more number of components. Further, the labels or names of the components are used only for illustrative purposes and do not limit the scope of the disclosure. One or more components can be combined to perform the same or substantially similar functions to control PDCP aggregation in wireless communication.

Figure 6:
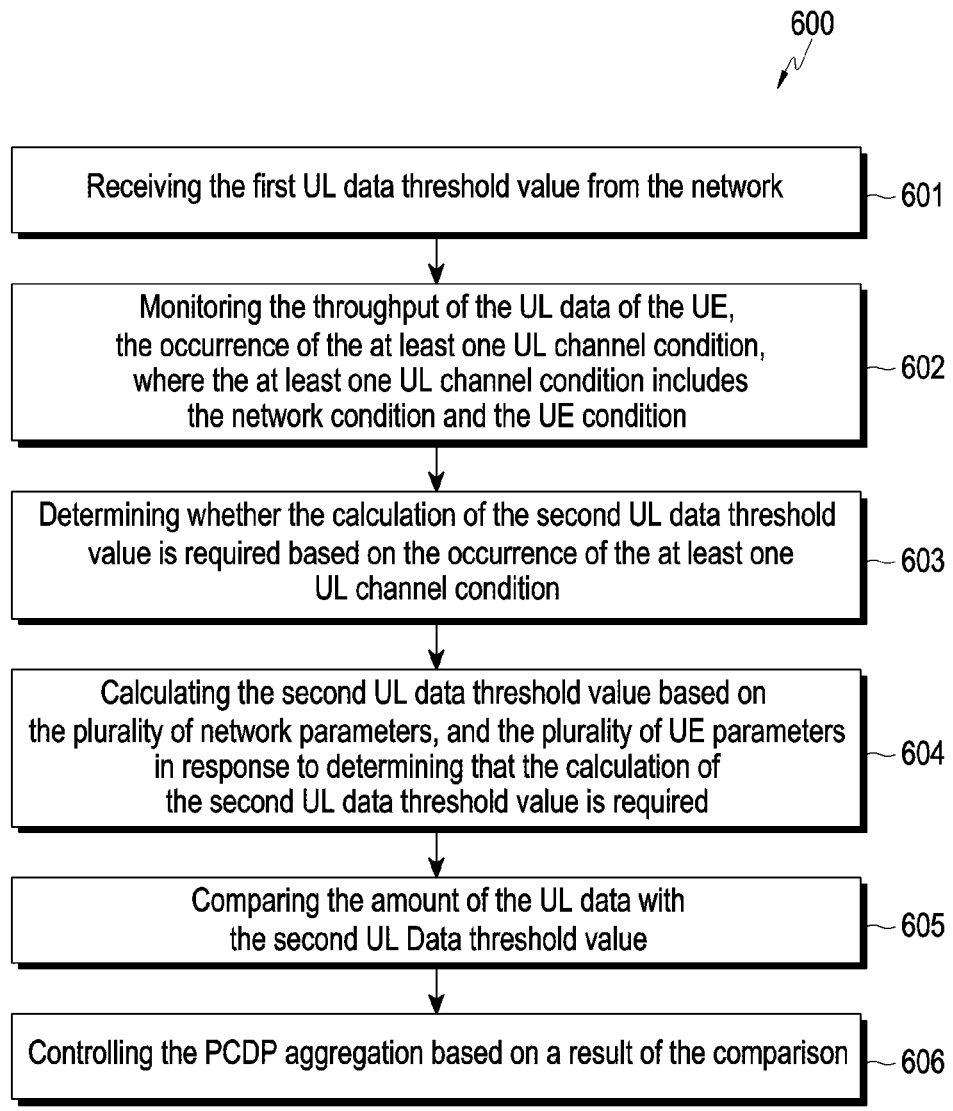
FIG. 6 is a flow diagram illustrating an example method for controlling the PDCP aggregation in wireless communication, according to various embodiments.

FIG. 6 is a flow diagram (600) illustrating an example method for controlling PDCP aggregation in wireless communication, according to various embodiments. Steps (601 to 606) may be performed, for example, by the UE (100) to control PDCP aggregation in wireless communication.

At step 601, the method includes receiving, by the monitoring engine (141), the first UL data threshold value from the network. At step 602, the method includes monitoring, by the monitoring engine (141), the throughput of the UL data of the UE (100) and occurrence of at least one UL channel condition, where the at least one UL channel condition includes a network condition and a UE condition. At step 603, the method includes determining, by the uplink data split threshold identifier (142), whether the calculation of the second UL data threshold value is to be performed or is required based on occurrence of the at least one UL channel condition. At step 604, the method includes calculating, by the uplink data split threshold identifier (142), the second UL data threshold value based on the plurality of network parameters and the plurality of UE parameters, in response to determining that the calculation of the second UL data threshold value is to be performed or is required. At step 605, the method includes comparing, by the uplink PDCP aggregator (144), an amount of UL data with the second UL data threshold value. At step 606, the method includes controlling, by the uplink PDCP aggregator (144), PCDP aggregation based on a result of the comparison.

In the disclosed method, the network configures a value of the UL data split threshold and sets the primary UL path/leg for the UE (100). The monitoring engine (141) monitors the UL data throughput, and the UL channel conditions. Furthermore, the monitoring engine (141) simultaneously monitors the lower layer throughput variation in response to a UL data request by an AP layer to determine the need for UL PDCP aggregation. The monitoring engine (141) identifies a need for a new UL data split threshold based on a condition of the network (e.g., network-configured UL parameters, dynamic uplink parameters) and/or a condition of the UE (e.g., battery, temperature, Tx power). Table 1 shows an example of the network-configured UL parameters and the dynamic uplink parameters.

TABLE 1

| | |
|---|---|
| Network-configured UL parameters | Number of UL carriers, BW per carrier, max modulation scheme per carrier, max supported UL layer per carrier, Subcarrier Spacing (SCS) per carrier |
| Dynamic UL parameters | UL Retx and BLER, Power, MTPL, and PHR in UL, signal condition (RSRP/RSRQ/SNR), path loss per carrier, configured UL BW part, allocated UL MCS |

Based on the network-configured UL parameters and the dynamic uplink parameters, the uplink data split threshold identifier (142) determines the UL data split threshold (UE-specific ul-DataSplitThreshold). The uplink data split threshold identifier (142) enables and/or disables UL PDCP aggregation only when the amount of UL data is greater than or less than the UL data split threshold. In an embodiment, before applying the UL data split threshold value, the monitoring engine (141) determines lower layer UL throughput variations for the T_TPUT_MONITOR time of the timer (143), before enabling or disabling PDCP aggregation, once the amount of the UL data exceeds and falls below the UL data split threshold value, respectively, to prevent or reduce continuous switching between PDCP aggregation on and off. The uplink data split threshold identifier (142), based on the UL data split threshold and observation of lower layer throughput variation, ensures (or improves the possibility) that the UE (100) does not switch to the UL PDCP aggregation in good channel conditions and optimizes (or improves) UL PDCP aggregation in poor channel conditions. In good channel conditions, the value of the UL data split threshold should be higher to ensure that the UE (100) does not switch to the UL PDCP aggregation unnecessarily. When the primary leg performance is poor, the value of the UL data split threshold will be reduced to ensure that the UE (100) can use UL PDCP aggregation.

Figure 7:
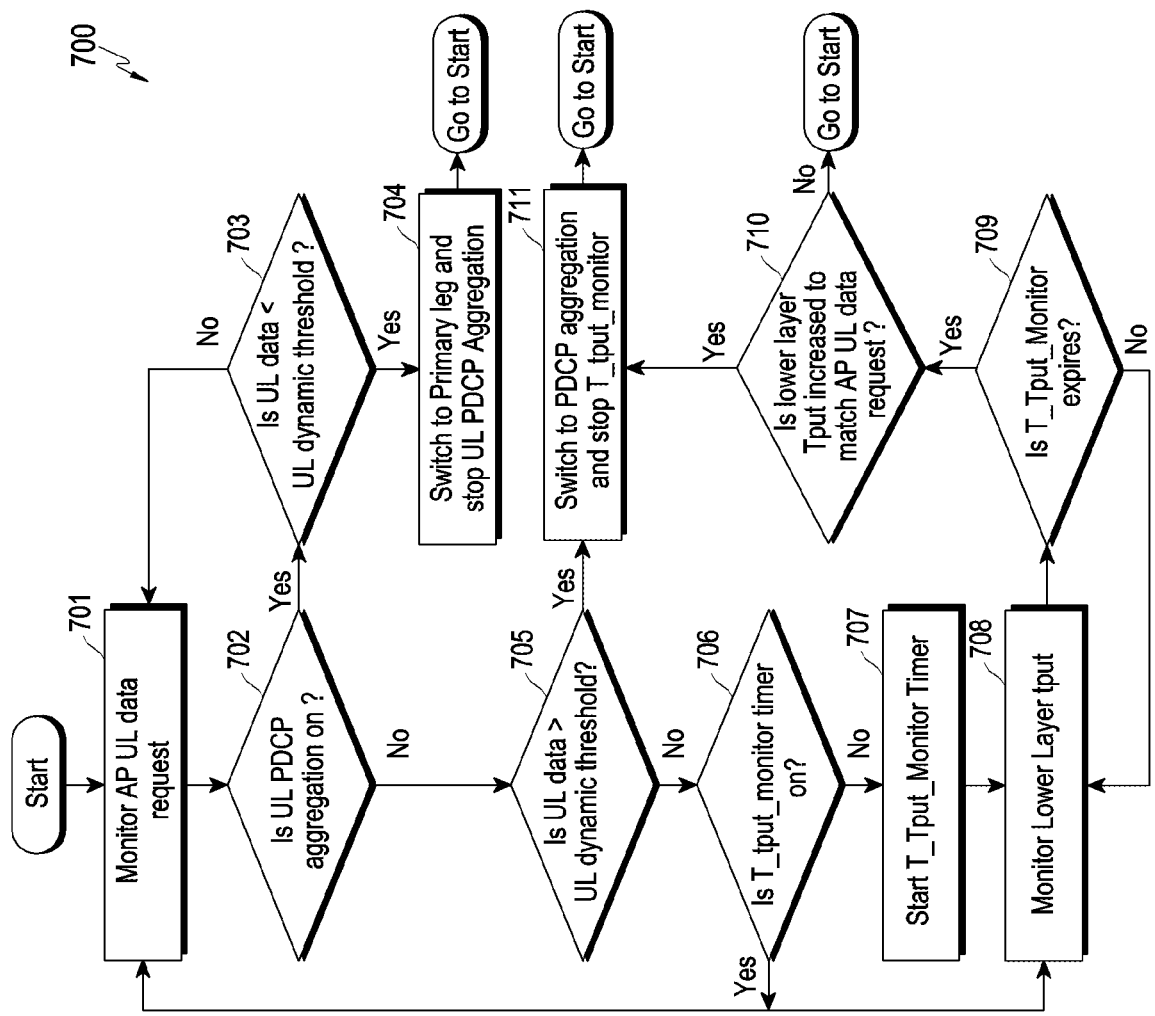
FIG. 7 is a flow diagram illustrating an example method for determining a dynamic UL data split threshold for controlling the PDCP aggregation in wireless communication, according to various embodiments.

FIG. 7 is a flow diagram (700) illustrating an example method for determining the dynamic UL data split threshold for controlling PDCP aggregation in wireless communication, according to various embodiments. Steps (701 to 711) may, for example, be performed by the UE (100) to control PDCP aggregation in wireless communication.

At step 701, the method includes continuously monitoring, by the monitoring engine (141), AP UL data request(s). According to an embodiment, step 701 corresponds to step 601 of FIG. 6. At step 702, the method includes determining, by the monitoring engine (141), whether UL PDCP aggregation is on in response to monitoring the AP UL data request. According to an embodiment, step 702 corresponds to step 602 of FIG. 6. At step 703, the method includes determining, by the uplink data split threshold identifier (142), whether the UL data is less than the UL dynamic threshold (or said amount of the UL data is less than a value of the UL dynamic threshold) in response to determining that UL PDCP aggregation is on. According to an embodiment, step 703 corresponds to step 603 of FIG. 6. At step 704, the method includes switching, by the uplink PDCP aggregator (144), to the primary leg and stopping, by the uplink PDCP aggregator (144), UL PDCP aggregation in response to determining that the UL data is less than the UL dynamic threshold. According to an embodiment, step 704 corresponds to steps 605-606 of FIG. 6. The method includes continuously monitoring AP UL data request(s) at step 701 in response to determining that the UL data is not less than the UL dynamic threshold.

At step 705, the method includes determining, by the uplink data split threshold identifier (142), whether the UL data is greater than the UL dynamic threshold (or whether the said amount of UL data is greater than the value of the UL dynamic threshold) in response to determining that UL PDCP aggregation is not turned on. According to an embodiment, step 705 corresponds to steps 604-605 of FIG. 6. At step 706, the method includes determining whether the T_tput_monitor timer (i.e., timer (143)) is turned on. The method includes continuously monitoring (708), by the monitoring engine (141), the lower layer UL throughput variations when the T_tput_monitor timer (143) is initially turned on or continuously monitoring AP UL data request(s) at step 701 in response to determining that the T_tput_monitor timer (143) is initially turned on. According to an embodiment, step 706 corresponds to step 606 of FIG. 6.

At step 707, if the T_tput_monitor timer (143) is not initially turned on, the method includes starting the T_tput_monitor timer (143). At step 708, the method includes continuously monitoring, by the monitoring engine (141), the lower layer UL throughput variations. At step 709, the method includes determining whether the T_tput_monitor timer (143) expires. The method includes continuously monitoring, by the monitoring engine (141), the lower layer UL throughput variations in response to determining that the T_tput_monitor timer (143) is not expired. At step 710, the method includes determining, by the monitoring engine (141), whether lower layer output increased to match the AP UL data request(s) in response to determining that the T_tput_monitor timer (143) is expired. The method includes continuously monitoring, by the monitoring engine (141), AP UL data request(s) at step 701 in response to determining that the lower layer output increased and does not match with AP UL data request(s). At step 711, the method includes switching, by the uplink PDCP aggregator (144), to PDCP aggregation and stopping the T_tput_monitor (143) in response to determining that the lower layer output increased and matches with the AP UL data request(s). According to an embodiment, steps 707-711 correspond to step 606 of FIG. 6.

In an embodiment, the UE (100) determines that the network configured threshold is not optimal and the dynamic threshold for PDCP aggregation should be determined (i.e., UL data split threshold). When the UE (100) detects a toggling in the PDCP aggregation as a result of frequent variations in signal strength, the disclosure proposes waiting for the timer (143), which the UE (100) monitors for stabilizing signal strength; if the signal strength stabilizes, PDCP aggregation is not modified; if it does not stabilize, the dynamic UL threshold is re-determined.

In an embodiment, the disclosed method has trigger event(s) that determine and apply the UL data split threshold based on the condition of the UE (100), the network condition, and other conditions, for example, as shown in Table 2.

TABLE 2

| | |
|---|---|
| UE condition | Battery level: If the UE battery level falls below a certain threshold, the UE may decide to optimize UL PDCP aggregation.<br>Temperature level: If the UE temperature level exceeds a certain threshold, the UE may decide to optimize UL PDCP aggregation. |

TABLE 2-continued

| | |
|---|---|
| Network condition | UE Tx power: If UE Tx power exceeds MTPL or a certain threshold value, the UE may decide to optimize UL PDCP aggregation.<br>Power headroom availability: Based on power headroom availability, the UE may optimize UL PDCP aggregation. UL MCS allocation, UL Scheduling fluctuation, UL SNR calculation, UL bandwidth allocation, number of UL carriers, UL MIMO configuration, Average UL MIMO allocation, and so on. |
| Other conditions | If the amount of UL data requests from the AP cannot be met by lower layer throughput, the UE may want to enable UL PDCP aggregation.<br>This disclosed solution may be considered by the UE from boot up (i.e., the disclosed solution may be applied always). |

In case of poor channel condition on the primary leg, primary leg performance can deteriorate such that even before the network-configured UL data split threshold is reached, the UE (100) can observe very low throughput and may not be able to meet data requirement from the application layer. The UL dynamic threshold will be configured lower than the network-configured UL data split threshold such that the PDCP aggregation will be triggered earlier, and the application layer data requirements can be serviced through the secondary leg. While the AP-required UL data is sent on the secondary leg, in parallel the UE (100) will send dummy BSR to the network on the primary leg, to meet the network-configured UL data split threshold.

Furthermore, as soon as the data required from the application layer decreases or the primary leg channel conditions improve, the UL dynamic threshold can be increased to the network-configured UL data split threshold. Furthermore, while UL activity on both legs temporarily increases power consumption, sending application UL data over the secondary leg reduces power consumption caused by high Tx-Power and UL-retransmission on the primary leg. Furthermore, the UL dynamic threshold can be set so that the increase in power usage caused by activity on both legs is less than the decrease in power usage caused by optimizing UL data over the secondary leg and saving power caused by high Tx-power and retransmissions on the primary leg.

Figure 8:
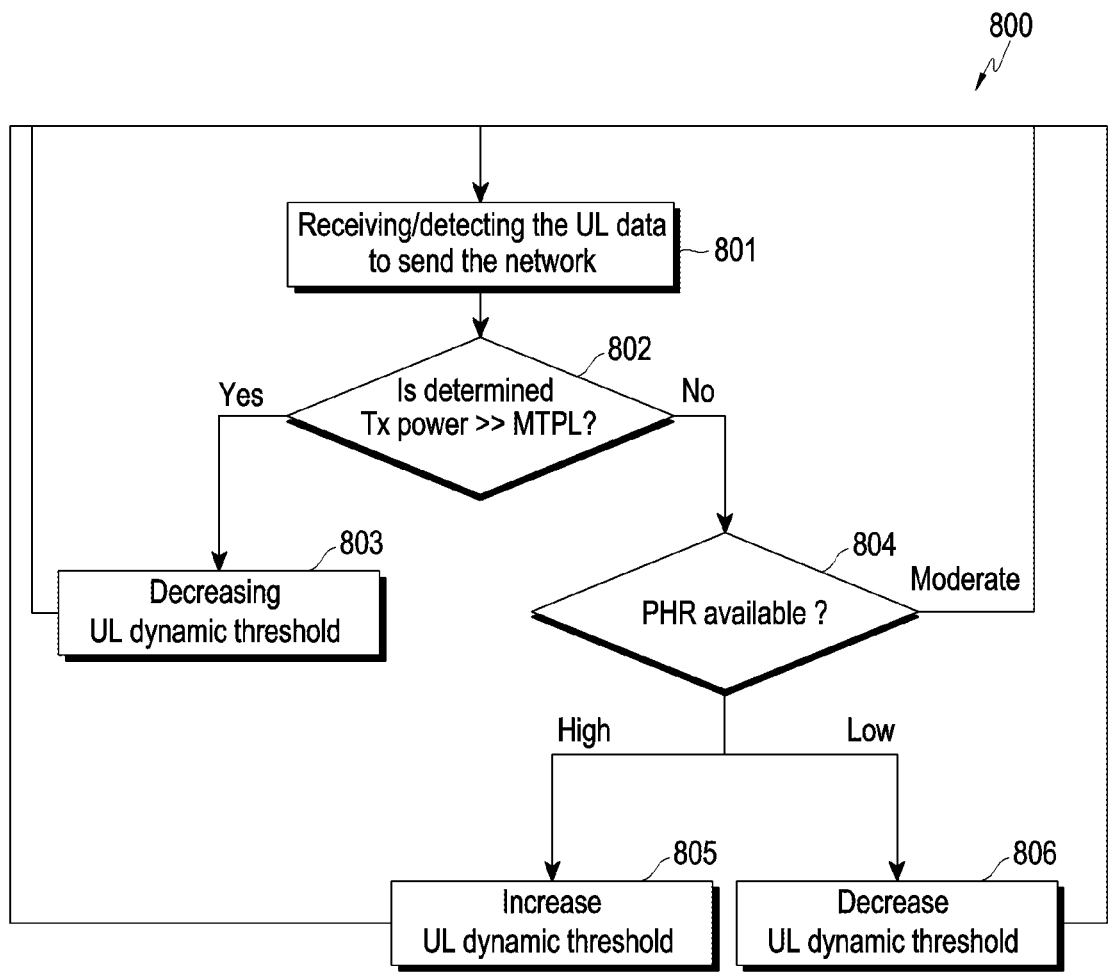
FIG. 8 is a flow diagram illustrating an example method for determining the UL data split threshold based on a Power Headroom Report (PHR) for controlling the PDCP aggregation in wireless communication, according to various embodiments.

FIG. 8 is a flow diagram (800) illustrating an example method for determining the UL data split threshold based on a Power Headroom Report (PHR) for controlling PDCP aggregation in wireless communication, according to various embodiments. Steps (801 to 805) may, for example, be performed by the UE (100) to control PDCP aggregation in wireless communication.

In the case of the NR, UL channel coverage may be less than DL channel coverage, owing to UL transmit power limitations of the UE (100). As a result, it can be important that the UE (100) determines its customized UL data split threshold value based on available PHR, calculated Tx power, and maximum possible Tx power in the primary leg.

At step 801, the method includes receiving/detecting, by the monitoring engine (141), the UL data to send to the network. At step 802, the method includes determining, by the monitoring engine (141), whether the Tx power is greater than the Maximum Possible Tx Power Level (MTPL) upon receiving/detecting the UL data to send to the network. At step 803, the method includes decreasing, by the uplink data split threshold identifier (142), the UL dynamic threshold (i.e., second UL data threshold value) in response to determining that the Tx power is greater than the MTPL and continuously monitoring the event mentioned in step 801.

At step 804, the method includes determining, by the monitoring engine (141), whether the Power Headroom Report (PHR) is available in response to determining that the Tx power is lower than the MTPL. At step 805, the method includes increasing, by the uplink data split threshold identifier (142), the UL dynamic threshold (i.e., second UL data threshold value) when the PHR available in the primary leg is high (i.e., UE (100) is allowed to transmit with more Tx power than current Tx power), and the UL data split threshold value can also be high (as higher power headroom availability suggests better UL channel condition). At step 806, the method includes decreasing, by the uplink data split threshold identifier (142), the UL dynamic threshold (i.e., second UL data threshold value) when the calculated Tx power is much lower than the MTPL. If the available power headroom in the primary leg is very low or close to zero (or negative), or if the calculated Tx power is close to or greater than the MTPL, the UL data split threshold value can be low. As a result, the UE implementation-specific value of the UL data split threshold may be a function of available PHR or the difference between the maximum available power of the UE (100) and the current transmit power of the UE (100), as shown in below equations.

$$\text{Modified UL data split threshold } \alpha \text{ (available power headroom in the primary leg)} \quad (1)$$

Or $$\text{Modified UL data split threshold } \alpha \text{ (maximum allowed Tx power/calculated Tx power)} \quad (2)$$

In an embodiment, the UE (100) determines UL data split ratio based on the PHR available, in the case of NR, UL channel coverage may be less than DL channel coverage, owing to the UL transmit power limitation of the UE (100). When UL PDCP aggregation is running, it can be important for the UE (100) to determine the UL data split ratio based on the PHR available, the current Tx power, and the maximum possible Tx power in each leg. If the PHR available in one leg is high (i.e., the UE (100) is permitted to transmit with more Tx power than the current Tx power), the data split ratio in that leg can be higher. The UL data split value ratio can also be high if the calculated Tx power is significantly lower than the maximum possible transmit power in the respective leg. On the other hand, if the PHR available in the primary leg is very low or close to zero (or negative), or if the determined Tx power is close to or greater than the maximum possible transmit power, the amount of UL data split ratio in that leg should be lower.

Figure 9:
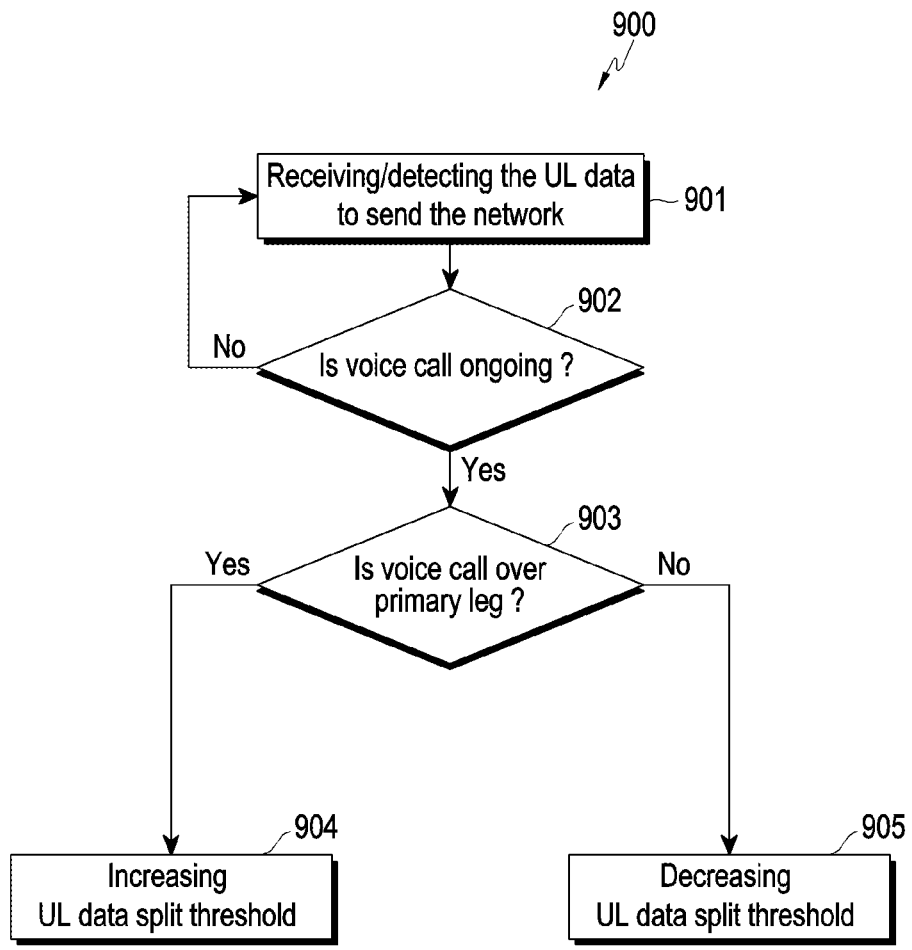
FIG. 9 is a flow diagram illustrating an example method for determining the UL data split threshold based on a Dynamic Power sharing (DPS) and ongoing services for controlling the PDCP aggregation in wireless communication, according to various embodiments.

FIG. 9 is a flow diagram (900) illustrating an example method for determining the UL data split threshold based on a Dynamic Power sharing (DPS) and ongoing services for controlling PDCP aggregation in wireless communication, according to various embodiments. Steps (901 to 905) may, for example, be performed by the UE (100) to control PDCP aggregation in wireless communication.

At step 901, the method includes receiving/detecting, by the monitoring engine (141), the UL data to send to the network. At step 902, the method includes determining, by the event detector (145), whether a voice call is still active/ongoing at the UE (100) during the receiving/detecting of UL data. The method includes continuously monitoring for any ongoing voice call at the UE (100) during the receiving/detecting of UL data in response to determining that the voice call is not ongoing at the UE (100) at step 902. At step 903, the method includes determining, by the event detector (145), whether the ongoing voice call is active on the primary leg, in response to determining that the voice call is ongoing at the UE (100) during the receiving/detecting of UL data. At step 904, the method includes increasing, by the uplink data split threshold identifier (142), the UL data split threshold (i.e., second UL data threshold value) in response to determining that the ongoing voice call is active on the primary leg. At step 905, the method includes decreasing, by the uplink data split threshold identifier (142), the UL data split threshold in response to determining that the ongoing voice call is not active on the primary leg.

If Dynamic Power Sharing (DPS) is enabled between the primary and secondary UL paths and priority services, such as a voice call, video call, or emergency call, are in progress, the corresponding UL path is treated as the highest priority by the UE. In this scenario, the other UL path may go without UL power because it is the lowest priority at this time. To calculate the UE-specific UL data split threshold (i.e., second UL data threshold value), it can be important to consider DPS and ongoing services. In this context, the following scenarios are possible.

a. When the primary UL leg is LTE and the voice call is ongoing over the LTE leg, it is optimal or better to configure the UL data split threshold as high as possible, taking into account the LTE leg UL channel condition and NR leg power availability after the DPS is applied.

b. When the primary UL leg is LTE and the voice call is ongoing over the NR leg, it is optimal or better to configure the UL data split threshold as low as possible, taking into account the NR leg uplink channel condition and LTE leg power availability after the DPS is applied.

c. When the primary UL leg is NR and the voice call is ongoing over the NR leg, it is optimal or better to configure the UL data split threshold as high as possible, taking into account the NR leg UL channel condition, the LTE leg power availability after the DPS is applied.

d. When the primary UL leg is NR, and the voice call is ongoing over the LTE leg. it is optimal or better to configure the UL data split threshold as low as possible, taking into account the LTE leg UL channel condition, and the NR leg power availability after the DPS is applied.

Figure 10:
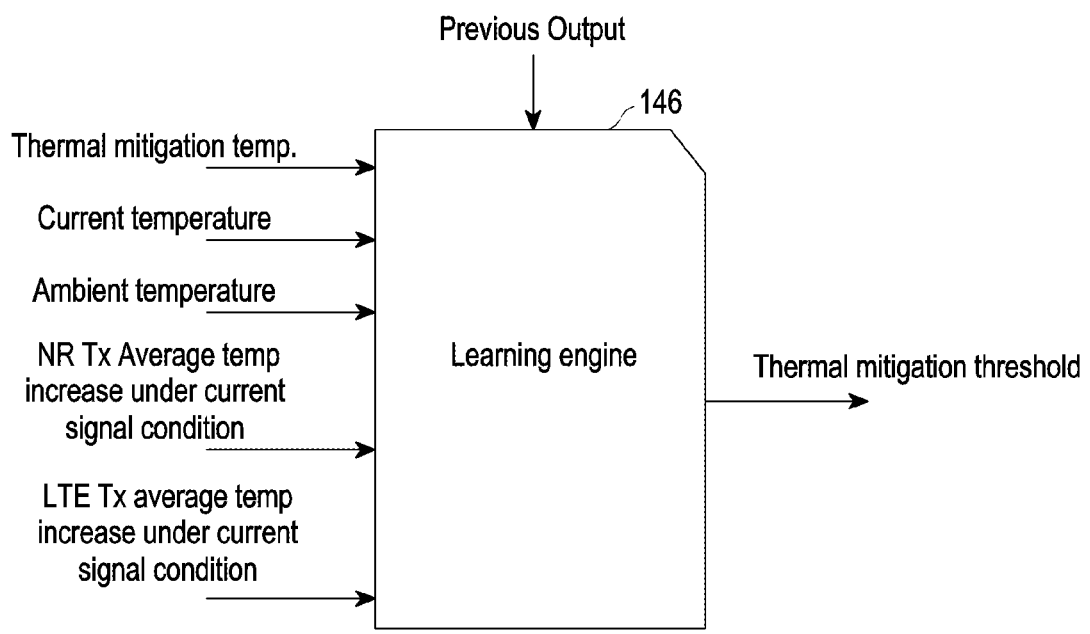
FIG. 10 illustrates a learning engine of an example UE for identifying a thermal mitigation threshold for controlling the PDCP aggregation in wireless communication, according to various embodiments.

FIG. 10 illustrates the learning engine (146) of an example UE (100) for identifying the thermal mitigation threshold for controlling PDCP aggregation in wireless communication, according to various embodiments.

The UE (100) identifies the threshold temperature after which UL leg fluctuation or aggregation can lead to thermal mitigation. The thermal mitigation threshold can be preconfigured or learned based on several parameters, which are discussed further below. This thermal mitigation threshold can assist the UE (100) in delaying thermal mitigation hit as much as possible.

The thermal mitigation threshold may be determined based on the thermal mitigation temperature configured in the UE (100), the current temperature of the UE (100), ambient temperature at that point of time, the average temperature increase caused by NR Tx at the current NR signal condition, and/or average temperature increase caused by LTE Tx at current LTE signal condition. The learning engine (146) will continue to learn these parameters/factors and maintain the database (110*a*) with this information along with the predicted output. The learning engine (146) continues to update the thermal mitigation threshold value based on the previously predicted output along with its loss function to keep the future loss function values lowered or at a minimum.

Figure 11:
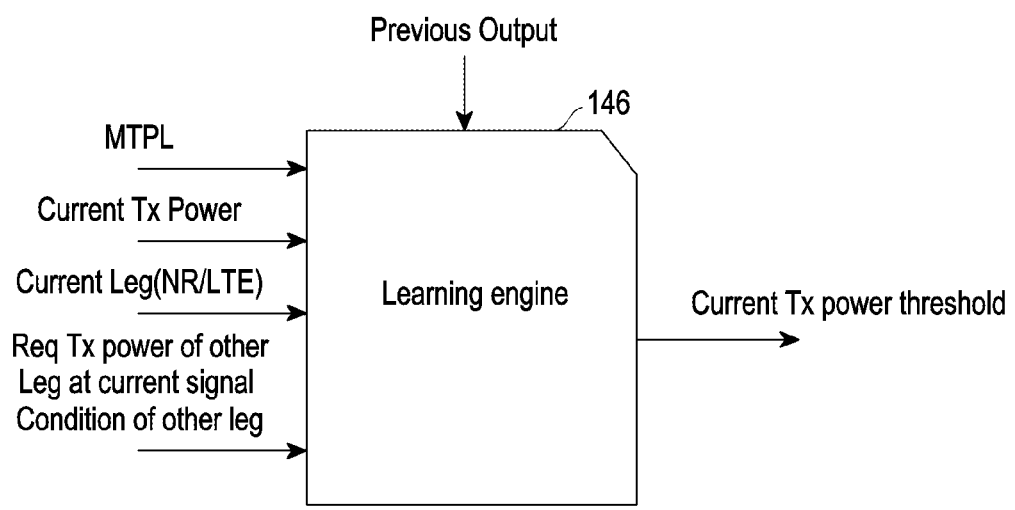
FIG. 11 illustrates a learning engine of an example UE for identifying a Tx power threshold to stop packet loss in wireless communication, according to various embodiments.

FIG. 11 illustrates the learning engine (146) of an example UE (100) for identifying the Tx power threshold to stop packet loss in wireless communication, according to various embodiments.

The learning engine (146) identifies the Tx power threshold after which UL leg switch or aggregation can cause the retransmission of packets. The UE Tx power after the dynamic power-sharing mechanism may not be sufficient to send data to the network. If the UE (100) uses UL split or aggregation, retransmission will increase, resulting in significant uplink throughput degradation and the possibility of RLF on any leg (possible causes RLC MAX Retransmission). So this Tx power threshold will help the UE (100) to optimize UL split decision. The Tx power threshold may be determined based on MTPL, Current leg, Tx power at the current leg, and/or Required Tx power of the other leg based on the current signal condition of the other leg. The UE (100) continues to learn these parameters/factors and maintains the database (110*a*) with this information along with the predicted output. The UE (100) continues to update the Tx power threshold value based on the previously predicted output along with its loss function to keep the future loss function values lowered or at a minimum.

In some existing systems, if the buffer status report indicates that there is more UL data than the network-provided UL data split threshold, the existing systems may begin splitting the entire UL grant in both legs even if the UE (100) has not sent any BSR in the secondary leg. In this scenario, a lower UL grant in the primary UL leg is possible even if the UL channel condition in the primary leg is sufficient to meet the UL data throughput requirement. For example, suppose the network has set the UL data split threshold to 10 Mb and the UE (100) is sending BSR in the primary UL leg at 20 Mb. In this case, the network may split the entire grant of total UL data requested (i.e., 20 Mb) between the primary and secondary legs. With a UL grant split ratio of 50:50 between the primary and secondary UL legs, the UE (100) can only achieve a throughput of 10 Mbps when using only the primary UL leg.

In an embodiment, to overcome this kind of scenario the method of the present disclosure identifies such network behavior based on the BSR reported in the primary leg, the network provided UL data split threshold, the network provided grant on both the primary and the secondary UL leg after BSR and other factors, if any. Once the UE (100) determines the amount of data split between the primary UL leg and the secondary UL leg, the UE (100) may indicate the amount of UL data in the BSR report higher than actual UL data so that the grants received by the network after splitting of UL grant (between the primary and secondary UL channel) will be sufficient to meet UL data requirement. For example, suppose the UL data split threshold configured by the network is 10 Mb and the UE (100) derived UL data split threshold is 30 Mb. The amount of split between the primary leg and the secondary leg is 50:50 by the network after the amount of UL data reported in BSR crosses the 10 Mb limit. Then UE (100) can indicate the amount of UL data is 60 Mb in the BSR report so that with a 50% split ratio also amount of UL data throughput requirement (i.e., 30 Mbps) can be met.

In the disclosed method, the UE (100) has two thresholds above which data may be split, (a) one set by the network and (b) one set by the UE (100). The one derived by the UE (100) will be the one set by the network's UL data split threshold+/−UE implementation-specific value. Between these two thresholds, the disclosed solution is applicable. If the type/amount of data does not necessitate the UL split, the UE (100) will determine to use the primary leg for UL transmissions in order to avoid unnecessary power consumption, temperature rise, and transmission failures. The UE (100) considers a learning mechanism, by utilizing the learning engine (146), to identify the better UL coverage case and use the better coverage leg for UL data transmissions until the UE-derived threshold is met. If the performance of both legs is comparable, the lower Radio Access Technology (RAT) may be used to transmit data to avoid unnecessary power consumption and temperature rise. The learning engine (146) accepts inputs such as operating frequency, Tx power, signal condition, and so on.

Figure 12:
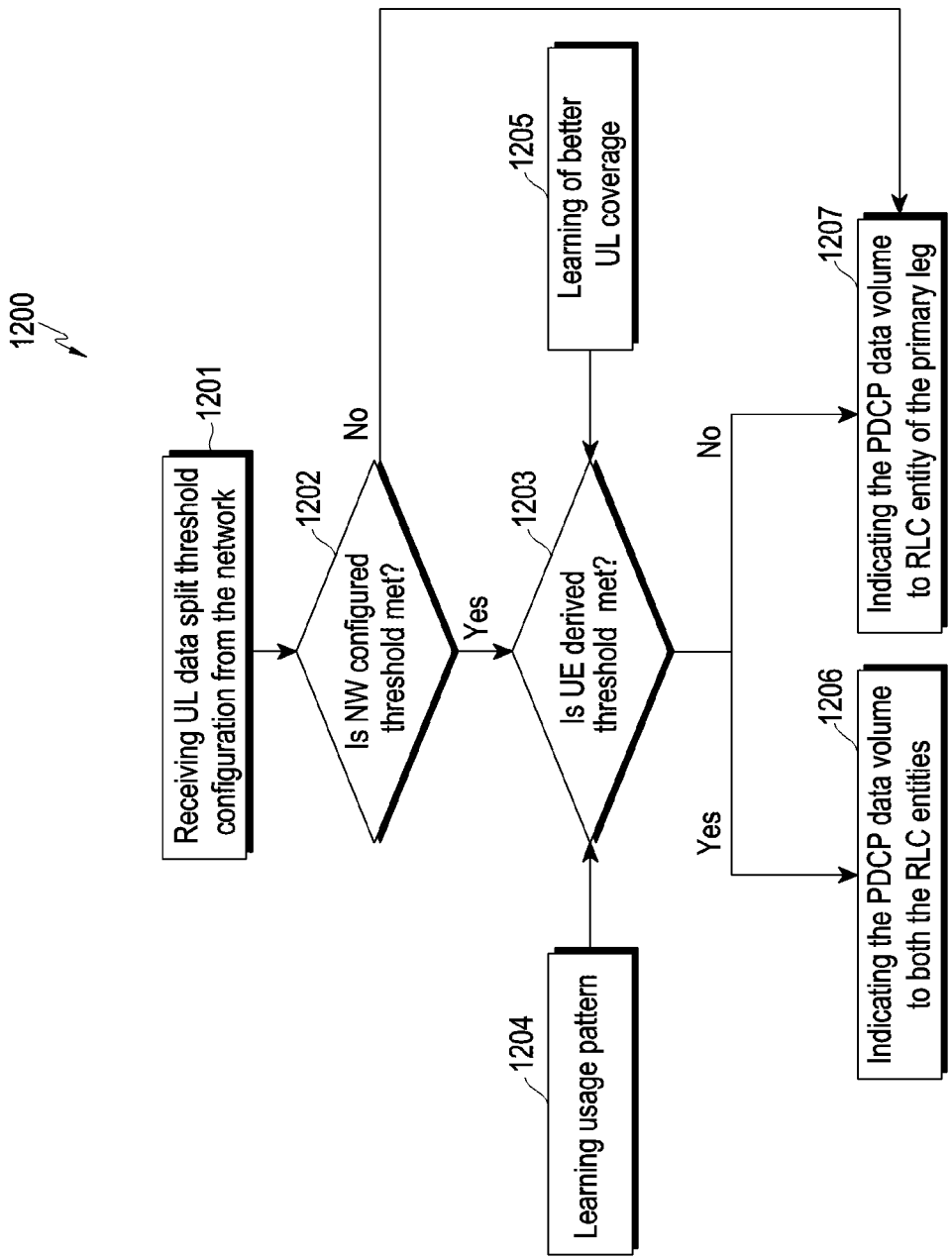
FIG. 12 is a flow diagram illustrating an example method for determining the UL data split threshold during a split of UL data for controlling the PDCP aggregation in wireless communication, according to various embodiments.

FIG. 12 is a flow diagram (1200) illustrating an example method for determining the UL data split threshold during a split of UL data for controlling PDCP aggregation in wireless communication, according to various embodiments. Steps (1201 to 1207) may, for example, be performed by the UE (100) to control PDCP aggregation in wireless communication.

At step 1201, the method includes receiving, by the monitoring engine (141), the UL data split threshold configuration from the network. At step 1202, the method includes determining, by the uplink data split threshold identifier (142), whether the network-configured threshold (UL data split threshold) meets the requirements. The method includes indicating, by the uplink data split threshold identifier (142), the PDCP data volume to the RLC entity of the primary leg in response to determining that the network-configured threshold (UL data split threshold) does not meet the requirements. At steps 1203, 1204, and 1205, the method includes determining, by the uplink data split threshold identifier (142), whether the UE-derived threshold meets the requirements by utilizing a learning usage pattern associated with the user of the UE (100) and a learning of better UL coverage, in response to determining that the network configured threshold (UL data split threshold) meets the requirements. At step 1206, the method includes indicating, by the uplink data split threshold identifier (142), the PDCP data volume to the RLC entities, in response to determining that the UE-derived threshold meets the requirements. At step 1207, the method includes indicating, by the uplink data split threshold identifier (142), the PDCP data volume to the RLC entity of the primary leg in response to determining that the UE-derived threshold does not meet the requirements.

Figure 13:
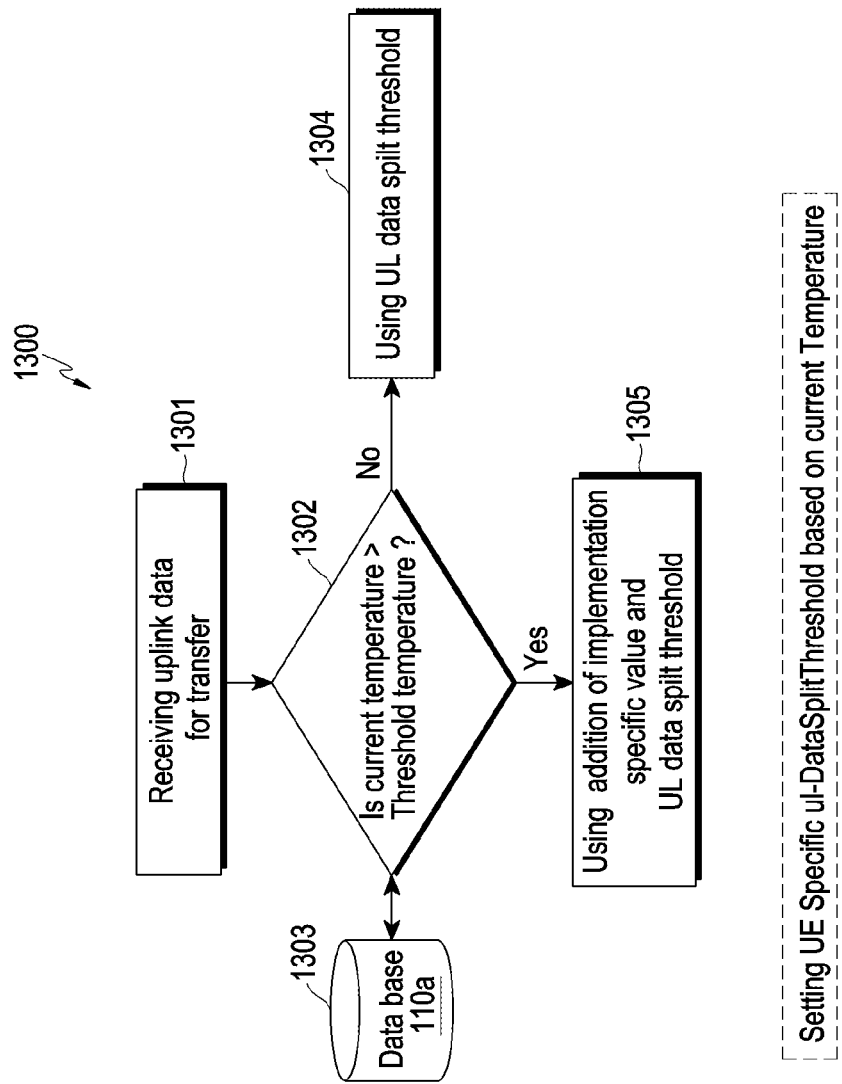
FIG. 13 is a flow diagram illustrating an example method for determining the UL data split threshold based on a current temperature level of an example UE for controlling the PDCP aggregation in wireless communication, according to various embodiments.

FIG. 13 is a flow diagram (1300) illustrating an example method for determining the UL data split threshold based on the current temperature level of an example UE (100) for controlling PDCP aggregation in wireless communication, according to various embodiments. Steps (1301 to 1305) may, for example, be performed by the UE (100) to control PDCP aggregation in wireless communication.

At step 1301, the method includes receiving, by the monitoring engine (141), the UL data for transfer. At steps 1302-1303, the method includes fetching, by the monitoring engine (141), the threshold temperature level/the current temperature level from the database (110*a*) and determining whether the current temperature level of the UE (100) is greater than the threshold temperature level, upon receiving the UL data for transfer. At step 1304, the method includes, by the uplink PDCP aggregator (144), performing PDCP UL data aggregation using the UL data split threshold, if required, in response to determining that the current temperature level of the UE (100) is lower than the threshold temperature level. At step 1305, the method includes, by the uplink PDCP aggregator (144), performing PDCP UL data aggregation using the addition of a UE implementation-specific value and the UL data spilt threshold, if required, in response to determining that the current temperature level of the UE (100) is greater than the threshold temperature level. If the current temperature level of the UE (100) is beyond the threshold value, it is very likely that, if the UE (100) makes UL data aggregation, it will hit thermal mitigation and eventually NR gets released. In this case, the UE (100) will maintain UE specific UL data split threshold by adding a delta on the network-configured UL data split threshold to avoid UL PDCP aggregation and eventually hitting thermal mitigation.

Figure 14:
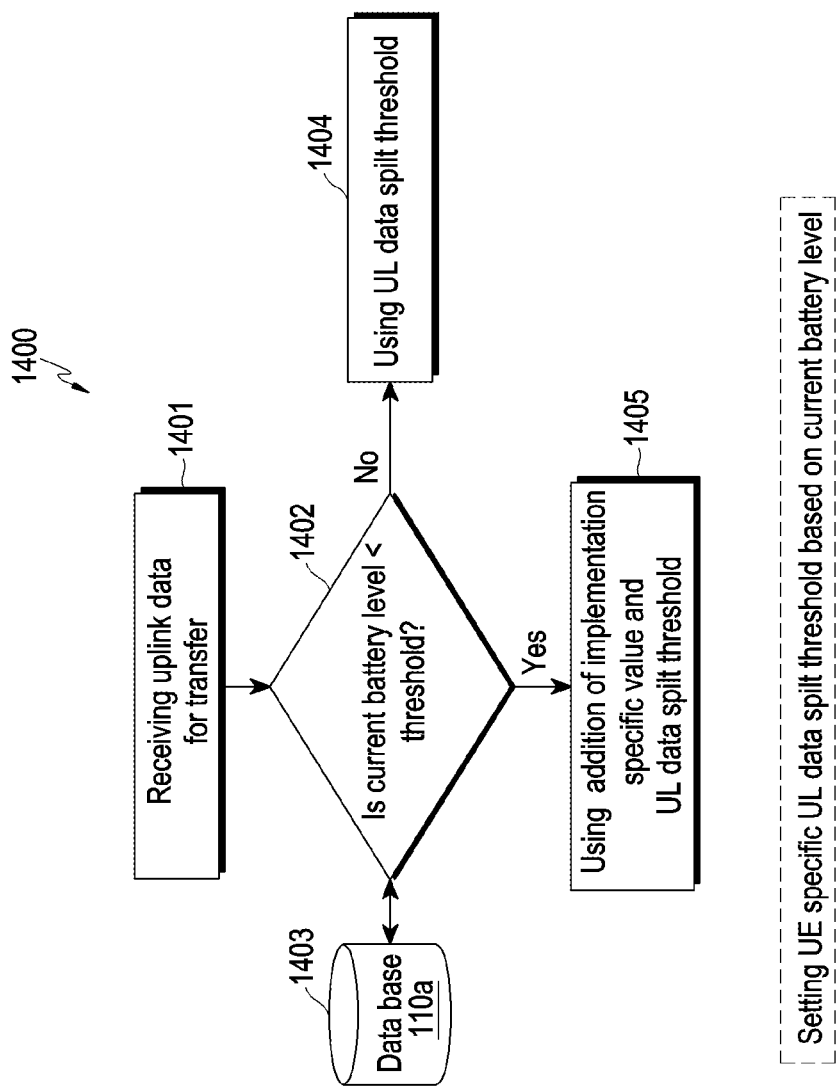
FIG. 14 is a flow diagram illustrating an example method for determining the UL data split threshold based on a current battery level of an example UE for controlling the PDCP aggregation in wireless communication, according to various embodiments.

FIG. 14 is a flow diagram (1400) illustrating an example method for determining the UL data split threshold based on the current battery level of an example UE (100) for controlling PDCP aggregation in wireless communication, according to various embodiments. Steps (1401 to 1405) may, for example, be performed by the UE (100) to control PDCP aggregation in wireless communication.

At step 1401, the method includes receiving, by the monitoring engine (141), the UL data for transfer. At steps 1402-1403, the method includes fetching, by the monitoring engine (141), the threshold battery level/the current battery level from the database (110*a*) and determining whether the current battery level of the UE (100) is lower than the threshold battery level upon receiving the UL data for transfer. At step 1404, the method includes performing, by the uplink PDCP aggregator (144), PDCP UL data aggregation using the UL data split threshold, if required, in response to determining that the current battery level of the UE (100) is greater than the threshold temperature level. At step 1405, the method includes performing, by the uplink PDCP aggregator (144), PDCP UL data aggregation using the addition of a UE implementation-specific value and the UL data spilt threshold, if required, in response to determining that the current battery level of the UE (100) is lower than the threshold battery level.

In the disclosed method, the UE (100) configures the threshold battery level (e.g., 20% of battery consumption left) value based on pre-configuration or learning based on the plurality of parameters associated with the UE (100) and the network. If the current battery level of the UE (100) is lower than the threshold battery level, it is very likely that the UE (100) will run out of battery and turn off if the UE (100) performs the UL data PDCP aggregation. In this case, the UE (100) keeps the UE-specific UL data split threshold by adding a delta to the network-configured UL data split threshold to avoid UL PDCP aggregation and eventually running out of battery life.

Figure 15:
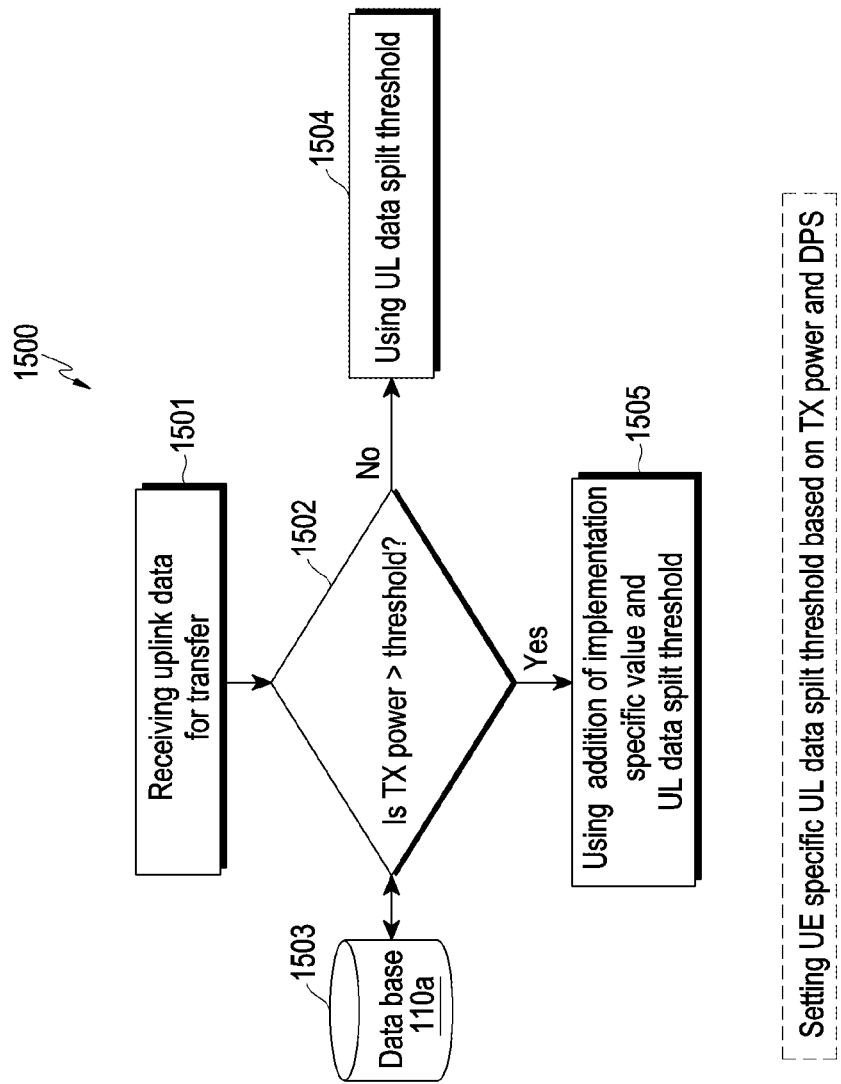
FIG. 15 is a flow diagram illustrating an example method for determining the UL data split threshold based on a Tx power and a DPS of an example UE for controlling the PDCP aggregation in wireless communication, according to various embodiments.

FIG. 15 is a flow diagram (1500) illustrating an example method for determining the UL data split threshold based on the Tx power and the DPS of an example UE (100) for controlling PDCP aggregation in wireless communication, according to various embodiments. Steps (1501 to 1505) may, for example, be performed by the UE (100) to control PDCP aggregation in wireless communication.

At step 1501, the method includes receiving, by the monitoring engine (141), the UL data for transfer. At steps 1502-1503, the method includes fetching, by the monitoring engine (141), the threshold Tx power/the current Tx power from the database (110*a*) and determining whether the current Tx power of the UE (100) is greater than the threshold Tx power upon receiving the UL data for transfer. At step 1504, the method includes performing, by the uplink PDCP aggregator (144), PDCP UL data aggregation using the UL data split threshold, if required, in response to determining that the current Tx power of the UE (100) is lower than the threshold Tx power. At step 1505, the method includes performing, by the uplink PDCP aggregator (144), PDCP UL data aggregation using the addition of a UE implementation-specific value and the UL data spilt threshold, if required, in response to determining that the current Tx power of the UE (100) is greater than the threshold Tx power.

In the disclosed method, the UE (100) configures the threshold Tx power (e.g., 20 dbm) value based on pre-configuration or based on learning according to the plurality of the parameters/current parameters associated with the UE (100) and the network (e.g., current RSRP, RSRQ, MTPL, calculated Tx Power, UL retransmission, etc.) in case the DPS feature is set in the UE (100). If the determined/current Tx power with the current RAT is very high or already approaching the MTPL, then it is very unlikely that having two RATs enabled at the same time will provide any throughput benefits. In fact, RLFs can be caused by continuous retransmissions on one or both legs in this scenario. In this case, the UE (100) keeps the UE-specific UL data split threshold by adding a delta to the network-configured UL data split threshold to avoid UL PDCP aggregation and eventually degraded UE UL performance. To overcome frequent UL leg ping pong or unnecessary UL aggregation, the UE (100) determines the delta (e.g., UE implementation-specific value) to be added to the UL data split threshold after which UL data split occurs, based on the above-mentioned threshold parameters determined by the UE (100). The UE (100) may encounter two scenarios when determining the UL data split threshold: (a) primary leg LTE and (b) primary leg NR.

In either case, the UE (100) identifies a new UE-perspective threshold at which the UE (100) will begin splitting the data in the UL. The UE (100) will also determine the UL data split threshold based on the primary UL path configured by the network.

In an embodiment, the UE (100) can initiate UE assistance information if it detects that the currently reconfigured UL data split threshold is not optimal for UE performance taking into account the amount of UL data, the channel quality of the primary and secondary legs, estimated throughput that can be achieved in each leg, the current battery level of the UE (100), the current temperature level of the UE (100), and the current Tx power of the UE (100).

Figure 16:
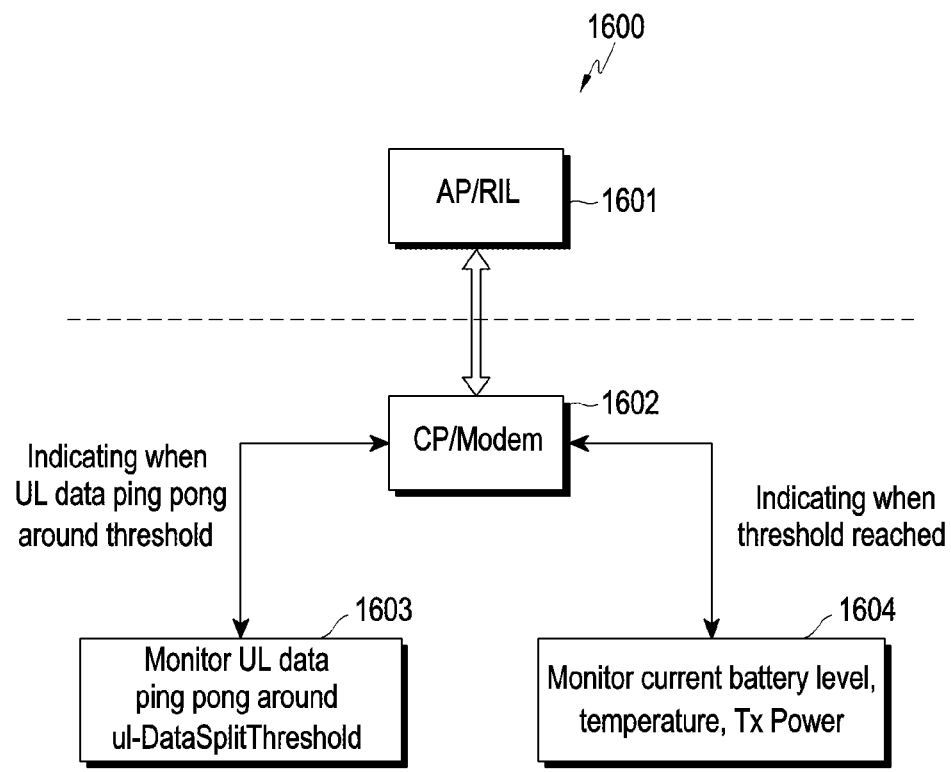
FIG. 16 illustrates an example scenario in which an example CP device sends an indication to an example AP device to control UL data volume at an application side, according to various embodiments.

FIG. 16 illustrates an example scenario (1600) in which an example CP device (e.g., cellular processor) sends an indication to an example Application Processor (AP) device to control UL data volume at an application side, according to various embodiments.

In the disclosed method, the CP device or modem (1602) will notify the AP device/Radio Interface Layer (RIL) (1601) about frequent UL data fluctuation (1603) above and below the network-configured UL data split threshold. In another scenario (1604), if the current UL Tx power exceeds the threshold Tx, the current temperature of the UE (100) exceeds the threshold temperature level, or the current battery level of the UE (100) falls below the threshold battery level, the CP device/modem (1602) will notify AP/RIL to throttle the UL data. The CP device (1602) can also update the current UL data split threshold configured at the CP device in this indication (1602).

When the AP device (1601) receives the indication from the CP device/modem (1602), the AP device (1601) performs at least one of the following actions:

a. The AP device (1601) may throttle UL data of a background application(s) and/or a foreground application(s) based on a priority of the application(s) so that UL data volume is maintained below the UL data split threshold until further indications received by the CP device/modem (1602).

b. If UL data volume can't be maintained under the UL data split threshold after step (a) also, the AP device (1601) may throttle all ongoing application's UL data so that the CP device/modem (1602) never falls in an undesired condition such as NR removal, LTE RLF, etc.

Figure 17:
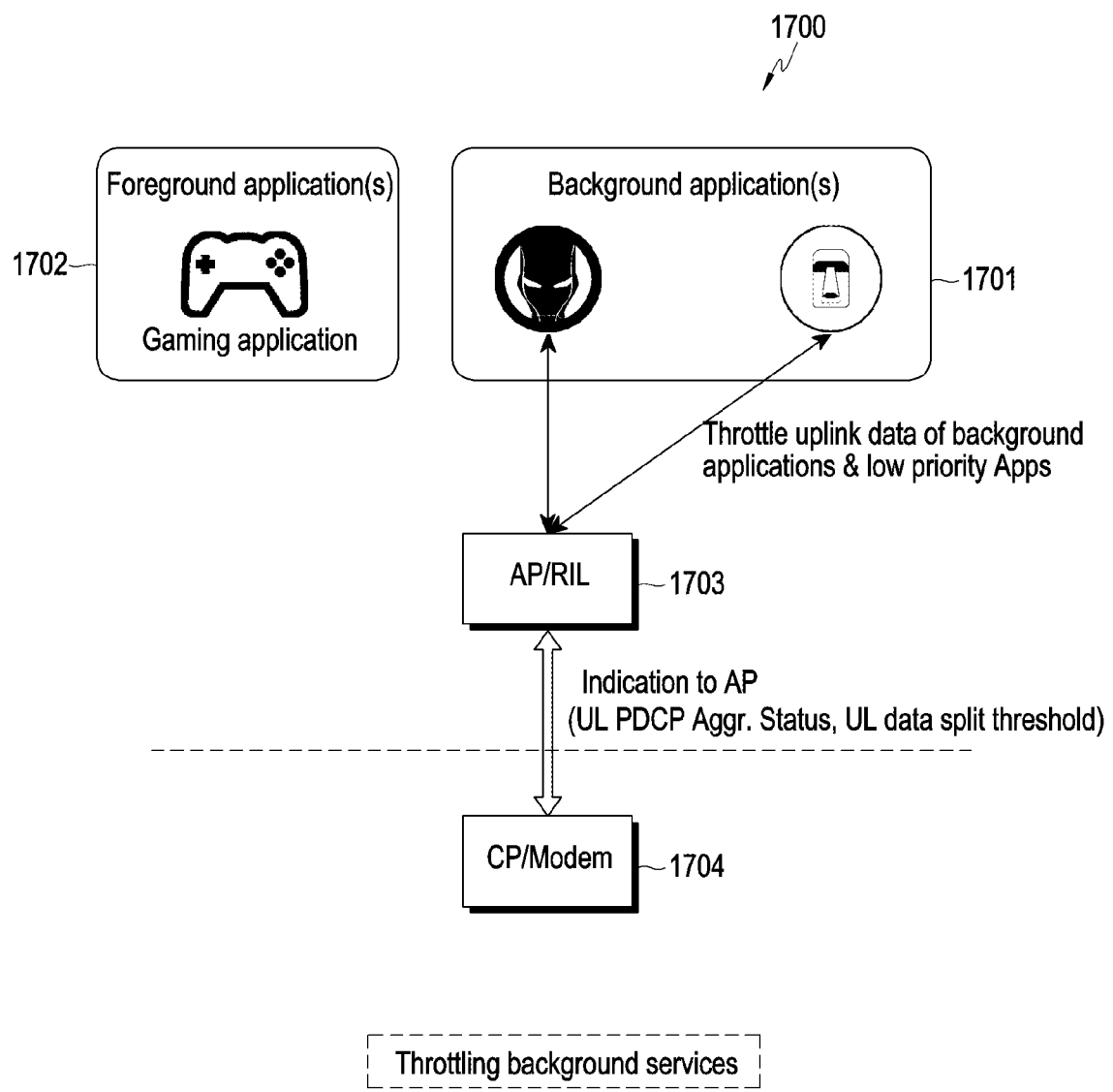
FIG. 17 illustrates an example scenario in which an example UE throttles UL data of background and low-priority applications based on an example CP device indication, according to various embodiments.

FIG. 17 illustrates an example scenario (1700) in which an example UE (100) (i.e., AP device) throttles UL data of the background and low-priority applications based on a CP device indication, according to various embodiments.

In the disclosed method, once the AP device (1703) receives a UL data indication from the CP device or modem (1704), the AP device (1703) throttles UL data of all background application(s) and low-priority foreground application(s) (1701) and services, allowing foreground application(s) (1702) to enjoy the highest possible throughput to improve user experience.

For example, suppose the user is currently playing an online game and a social media application is running in the background and performing continuous polling that is not required at the time. Once the AP device (1703) receives an indication from the CP device or modem (1602) regarding low battery, high temperature, or possible RLFs due to high Tx power, the AP device (1703) will throttle the background applications first to reduce the amount of UL data generated.

Figure 18:
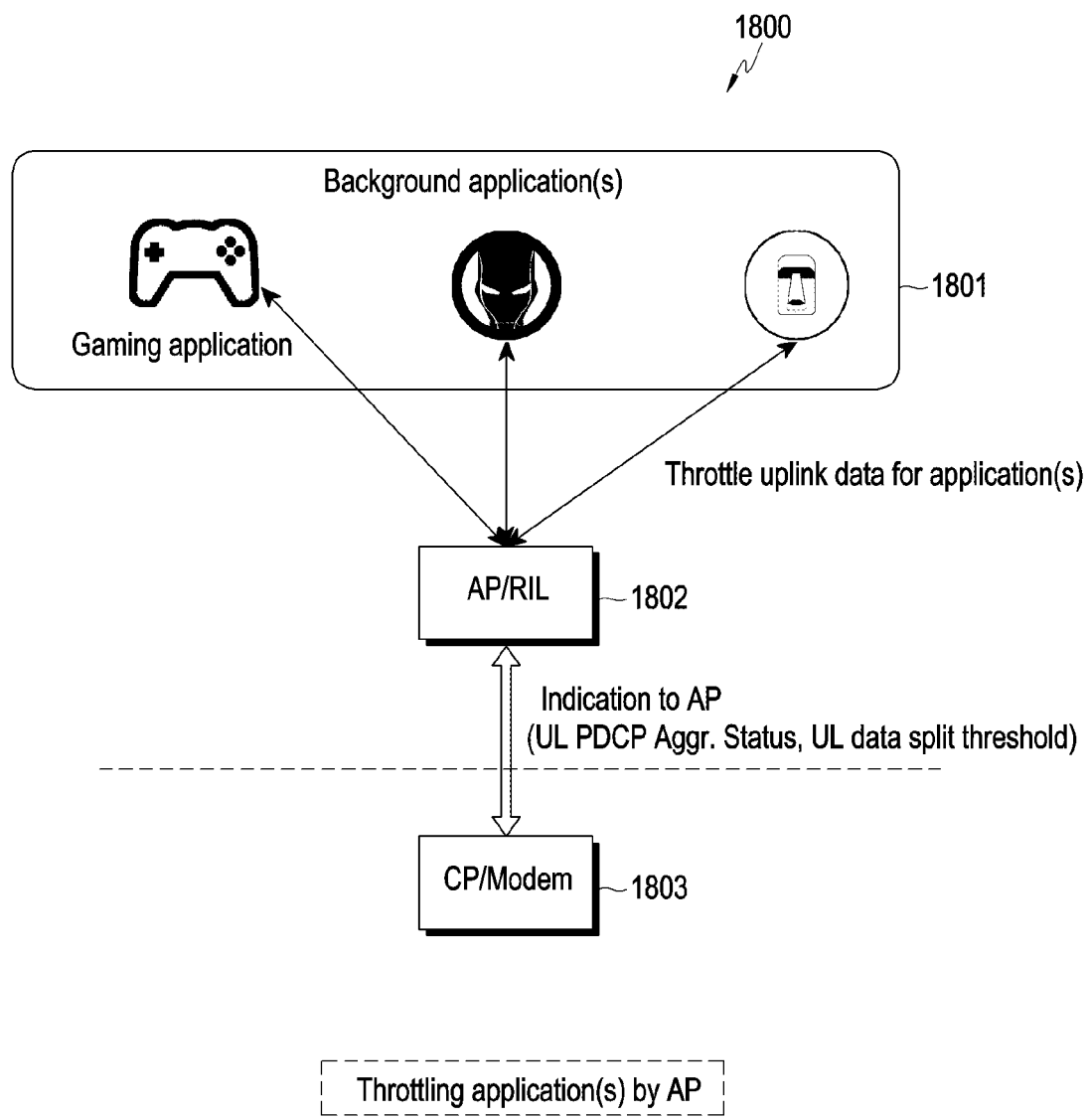
FIG. 18 illustrates an example scenario in which an example UE throttles UL data of all applications based on an example CP device indication, according to various embodiments.

FIG. 18 illustrates an example scenario (1800) in which an example UE (100) (i.e., AP device) throttles UL data of all applications based on the CP device Indication, according to various embodiments.

Once the AP device (1802) receives the UL data indication from the CP device or modem (1803), the AP device (1802) throttles the UL data of all ongoing applications (1801) so that the amount of UL data never reaches the UL data split threshold. The AP device (1802) will use the current UL data split threshold used at the CP device or modem (1803) to determine the level or percentage of throttling required for each application during this UL data throttling (1801). As a result, the UE (100) can avoid thermal mitigation, unnecessary power drainage, and RLFs.

Figure 19:
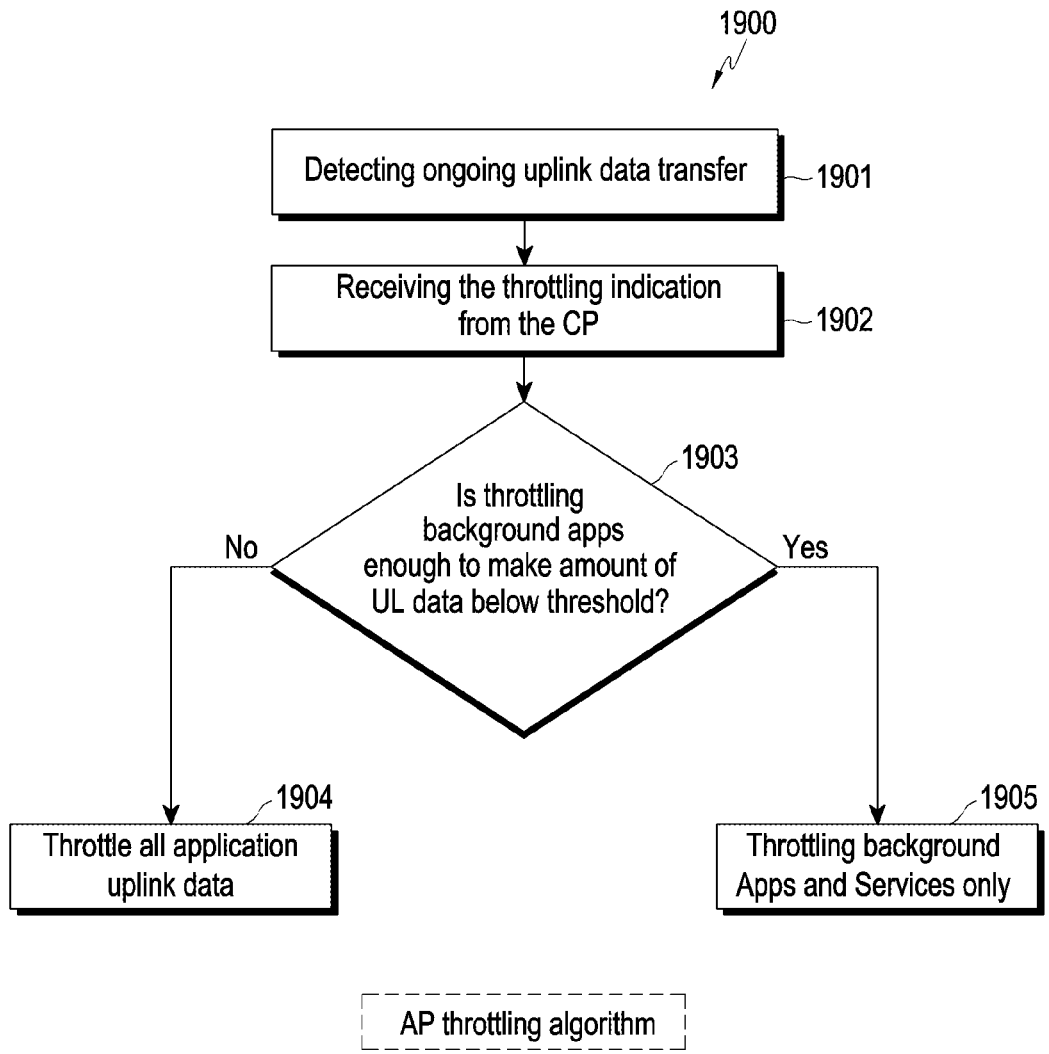
FIG. 19 is a flow diagram illustrating an example method for throttling UL data of the background, the low-priority applications, and/or all applications based on the CP indication, according to various embodiments.

FIG. 19 is a flow diagram (1900) illustrating an example method for throttling UL data of the background, the low-priority applications, and/or all applications based on the CP indication, according to various embodiments. Steps (1901 to 1905) may, for example, be performed by the UE (100) to control PDCP aggregation in wireless communication.

At step 1901, the method includes detecting, by the monitoring engine (141), ongoing UL data transfer. At step 1902, the method includes receiving, by the monitoring engine (141), the throttling indication from the CP device. At step 1903, the method includes determining, by the throttling controller (147), whether the throttling of the background application(s) is sufficient to make the amount of UL data less than the UL data split threshold upon receiving the throttling indication from the CP device. At step 1904, the method includes throttling, by the throttling controller (147), all application UL data in response to determining that the throttling of the background application is not sufficient to make the amount of UL data less than the UL data split threshold. At step 1905, the method includes throttling, by the throttling controller (147), the background application(s) and services only (background service) in response to determining that the throttling of the background application is sufficient to make the amount of UL data less than the UL data split threshold.

In an embodiment, the disclosed method includes modifying several parameters (for example, the PHR, the CQI, and the BSR) to prevent UL leg switch fluctuation. Based on the learning, the UE (100) detects UL leg switch fluctuation, such as existing signal condition, power headroom reporting, buffer status report, CQI estimation, UL Tx power, and MTPL values, at which point the network decides to change the UL path or perform the UL leg switch. Once the UE (100) detects that the NR channel condition is deteriorating and that the network may ping pong between the primary uplink path (e.g., LTE→NR, NR→LTE), the UE (100) can modify its PHR, CQI reporting, and buffer status report to prevent this ping pong and remain in the LTE path as the primary leg. Race conditions caused by frequent UL leg switches, excess battery consumption, and thermal mitigation can thus be avoided. This solution may also improve UL throughput by transmitting UL data in the LTE leg (rather than the NR leg), as the NR leg will increase retransmission and RLF due to the maximum retransmission.

In an embodiment, the disclosed method includes modifying, by the network, the UL data split threshold during the UL leg switch. In the disclosed method, if the UL channel condition in the NR is deteriorating and the network identifies that the NR conditions are fluctuating based on PHR reports, channel quality estimation, and so on, the network can change its primary uplink leg to the LTE and/or increase the UL data split threshold to prevent the UE from falling back and forth in the NR during fluctuating channel conditions. Similarly, if the LTE channel condition deteriorates while the NR channel condition improves, the network can change its primary UL path to the NR and/or increase its UL data split threshold to ignore the LTE uplink leg during this time.

In an embodiment, if the network identifies that the UL leg can toggle more frequently due to some coverage gap or deployment scenario, the network can change the UL path from split bearer to MCG-only bearer (or SCG-only bearer) to avoid resource waste and reconfigure split bearer when channel conditions improve.

In an embodiment, if the network determines to use the NR leg in UL, but the NR or gNB is overloaded, and the network wants to minimize or reduce the load on the NR while maximizing or increasing usage when the NR is actually needed, the network can configure split DRB with the primary path as the LTE and a lower UL data split threshold value.

The various actions, acts, blocks, steps, or the like in the flow diagrams (600, 700, 800, 900, 1200, 1300, 1400, 1500, 1600, and 1900) may be performed in the order presented, in a different order, or simultaneously. Further, in various embodiments, some of the actions, acts, blocks, steps, or the like may be omitted, added, modified, skipped, or the like without departing from the scope of the disclosure.

The disclosed PDCP aggregation has advantages over the existing PDCP aggregation including, but not limited to, those listed below:

a. The UE (100) determines the need for a new UL data split threshold based on the network condition (e.g., configured UL parameters, dynamic UL parameters, etc.) and the UE condition (e.g., battery, temperature, Tx Power, etc). The UE (100) determines the UL dynamic threshold (UE specific ul-DataSplitThreshold) based on the network configuration parameters (e.g., BW, MIMO layer, Number of UL carriers, etc.) and dynamic parameters (e.g., Tx power, Pathloss, BLER, allocated UL MCS, etc.). The UE (100) will enable and disable UL PDCP aggregation only when the amount of UL data exceeds and falls below the UL data split threshold. As a result, there will be no increase (or reduced increase) in Tx power, battery consumption, or temperature. The disclosed method enhances UL performance and enriches user experience for PDCP aggregation in wireless communication.

b. If the PHR available in the primary leg is high (i.e., the UE (100) is permitted to transmit with more Tx power than the current Tx power), the UE (100) can determine the UL data split threshold value to be high as well. If the PHR available in the primary leg is very low or close to zero (or negative), the UE (100) that determines the UL data split threshold value can be low. As a result, there will be no increase (or reduced increase) in Tx power for PDCP aggregation in wireless communication.

c. The UE (100) will enable the dynamic UL split threshold based on ongoing services and DPS availability. As a result, the disclosed method enhances the UL performance and enriches the user experience for PDCP aggregation in wireless communication.

d. The UE (100) determines the Tx power threshold above which the UL leg switch or aggregation can cause packet retransmission. The UE Tx power after the DPS mechanism may not be sufficient to send data to the network. If the UE (100) uses UL split or aggregation, retransmission will increase, resulting in significant UL throughput degradation and the possibility of RLF on any leg (possibly causing RLC MAX Retransmission). As a result, this Tx power threshold will assist the UE (100) in optimizing or improving the UL split decision.

e. In the disclosed method, the CP device or modem will indicate to the AP device/RIL about frequent UL data fluctuation above and below the UL data split threshold configured by the network. In another scenario, if the current UL Tx power is going beyond the UL data split threshold or the current temperature level of the UE (100) is going beyond the threshold temperature or the current battery level of the UE (100) is below the threshold battery level, the CP device/modem will indicate to the AP/RIL to throttle the UL data. As a result, there will be no increase (or reduced increase) in Tx power, battery consumption, or temperature. The disclosed method enhances the UL performance and enriches the user experience.

f. The UE (100) will detect UL leg switch fluctuation based on the learning, for example, existing signal condition, PHR, buffer status report, CQI estimation, UL Tx power, MTPL values at what condition the network is deciding to change the UL path or perform the UL leg switch. Once the UE (100) detects that the NR channel condition is going bad and there is a possibility that the network will ping pong between the primary uplink path (e.g., LTE→NR, NR→LTE), the UE (100) will modify its PHR, CQI reporting, buffer status report to stop this ping pong and remain in LTE path as the primary leg. As a result, the UE's Tx power, battery consumption, or temperature will not increase (or will have a reduced increase).

g. The network can change the UL data split threshold during the UL leg switch so that if the UL channel condition in the NR is bad and the network identifies that the NR conditions are fluctuating based on the PHR report, channel quality estimation, and so on, the network can change its primary UL leg to LTE and/or increase the UL data split threshold to avoid the UE (100) falling back and forth in the NR during fluctuating channel condition. Similarly, if the LTE channel condition deteriorates while the NR channel condition improves, the network can change its primary UL path to the NR and/or increase its UL data split threshold to ignore the LTE UL leg during this period. As a result, the UE's Tx power, battery consumption, or temperature will not increase (or will have a reduced increase).

Unless otherwise defined, all technical and scientific terms used herein have the same meaning as commonly understood by one ordinary skilled in the art to which this disclosure belongs. The system, methods, and examples provided herein are illustrative only and not intended to be limiting.

While specific language has been used to describe the present subject matter, any limitations arising on account thereto, are not intended. As would be apparent to a person in the art, various working modifications may be made to the method to implement the inventive concept as taught herein. The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the scope of the embodiments as described herein.

What is claimed is:

1. A method for controlling, by a User Equipment (UE), Packet Data Convergence Protocol (PDCP) aggregation in a dual connectivity mode, the method comprising:
    receiving a first Uplink (UL) data threshold value from a network;
    monitoring a throughput of UL data of the UE and occurrence of at least one UL channel condition;
    determining whether to perform a calculation of a second UL data threshold value, based on the occurrence of the at least one UL channel condition;
    calculating the second UL data threshold value based on a plurality of network parameters and a plurality of UE parameters, based on determining to perform the calculation of the second UL data threshold value, wherein the plurality of network parameters include at least one of network-configured UL parameters, and dynamic UL parameters, and the plurality of UE parameters is related to at least one of a battery, a temperature and a Tx power of the UE;
    comparing an amount of the UL data with the second UL data threshold value; and
    based on the comparing indicating that the amount of the UL data is greater than the second UL data threshold value:
        monitoring a throughput variation in lower layers until expiration of a time period of a timer;
        determining whether the throughput variation is stable after the expiration of the time period of the timer; and
        enabling PDCP aggregation based on determining that the throughput variation is stable.

2. The method of claim 1, further comprising:
    disabling the PDCP aggregation based on the comparing indicating that the amount of the UL data is less than the second UL data threshold value.

3. The method of claim 1, further comprising:
    recalculating the second UL data threshold value based on determining that the throughput variation is not stable after the expiration of the time period of the timer; and
    obtaining a third UL data threshold value with respect to the second UL data threshold value based on the recalculating.

4. The method of claim 1, wherein the first UL data threshold value and the second UL data threshold value indicate respective limits in the amount of UL data for controlling PDCP aggregation, and
    wherein the amount of UL data is configured to flow through one of a primary leg or a secondary leg of an NR RLC entity and an LTE RLC entity.

5. The method of claim 1, further comprising:
    determining an occurrence of a poor UL channel condition, as the network condition on a primary leg of one of an NR RLC entity or an LTE RLC entity based on the monitoring of the UL channel condition, the throughput variation in the lower layers, and a data requirement in upper layers;
    calculating the second UL data threshold value to be lower with respect to the first UL data threshold value based on the determining of the occurrence of the poor UL channel condition;
    aggregating the amount of the UL data over both a primary and a secondary leg of one of the NR RLC entity or the LTE RLC entity while PDCP aggregation is enabled; and
    sending a dummy BSR to the network on the primary leg of the one of the NR RLC entity or the LTE RLC entity.

6. The method of claim 5, further comprising:
    determining an improvement in at least one of the UL channel condition, the data requirement in the upper layers, or the throughput variation in the lower layers; and
    recalculating the second UL data threshold value to increase the second UL data threshold value to the first UL data threshold value based on the determining of the improvement in the at least one of the UL channel condition, the data requirement in the upper layers, or the throughput variation in the lower layers.

7. The method of claim 1, further comprising:
    measuring UE parameters including at least one of an available power headroom in a primary leg of one of an NR RLC entity or an LTE RLC entity, a transmission power of the UE, or a Maximum Transmission Power Level (MPTL) in the primary leg;
    determining occurrence of the at least one UL channel condition indicating that the transmission power of the UE is greater than the MPTL in the primary leg based on a comparison of the transmission power of the UE with the MPTL in the primary leg; and
    calculating the second UL data threshold value to be decreased with respect to the first UL data threshold value based on determining the occurrence of the transmission power of the UE being greater than the MPTL in the primary leg.

8. The method of claim 7, further comprising:
determining occurrence of the at least one UL channel condition indicating that the transmission power of the UE is less than the MPTL in the primary leg based on the comparison of the transmission power of the UE with the MPTL in the primary leg;
determining the available power headroom in the primary leg is high based on the determination of the occurrence of the at least one UL channel condition indicating that the transmission power of the UE is less than the MPTL in the primary leg, wherein the available power headroom in the primary leg being high indicates that the UE is allowed to transmit with a transmission power greater than a current transmission power; and
calculating the second UL data threshold value to be increased with respect to the first UL data threshold value based on determining the available power headroom in the primary leg is high.

9. The method of claim 8, further comprising:
determining the available power headroom in the primary leg is low based on determining occurrence of the at least one UL channel condition indicating that the transmission power of the UE is close to the MPTL in the primary leg, wherein the available power headroom in the primary leg being low indicates the UE is not allowed to transmit with much higher the transmission power; and
calculating the second UL data threshold value to be decreased with respect to the first UL data threshold value based on determining the available power headroom in the primary leg is low.

10. The method of claim 7, further comprising:
determining a UL data split ratio during PDCP aggregation based on the available power headroom, a current transmission power of the UE, or a MTPL in the primary leg and a secondary leg; and
determining whether the available power headroom is high on the primary leg or in the secondary leg, wherein the UL data split ratio is higher on one of the primary leg or the secondary leg based on a result of the determining.

11. The method of claim 1, further comprising:
determining whether an ongoing service is related to a voice call;
determining, based on determining that the ongoing service is related to the voice call, whether the ongoing service is provided over a primary leg; and
calculating the second UL data threshold value to be increased with respect to the first UL data threshold value based on determining that the ongoing service is provided over the primary leg, wherein the second UL data threshold value is calculated to be decreased with respect to the first UL data threshold value based on determining that the ongoing service is not provided over a secondary leg.

12. The method of claim 1, further comprising:
measuring UE parameters including at least one of a thermal mitigation temperature value configured in the UE, a current temperature of the UE, an ambient temperature at a particular instant of time, an average temperature increase caused due to an NR transmission at a current NR signal condition, or an average temperature increase caused due to LTE transmission at a current LTE signal condition;
inputting the UE parameters into a machine learning (ML) model;
predicting, using the ML model, a thermal mitigation threshold value based on the inputted UE parameters; and
updating the second UL data threshold value based on the predicted thermal mitigation threshold value,
wherein the PDCP aggregation is controlled based on the updated second UL data threshold value.

13. The method of claim 1, further comprising:
measuring UE parameters including at least one of a maximum transmission power on a primary leg (MTPL), a transmission power at a current leg, or a required transmission power of another leg based on a current signal condition of the another leg;
inputting UE parameters into a machine learning (ML) model;
predicting, using the ML model, a transmission power threshold value based on the inputted UE parameters; and
updating the second UL data threshold value based on the predicted transmission power threshold value,
wherein the PDCP aggregation is controlled based on the updated second UL data threshold value.

14. The method of claim 10, further comprising:
updating a buffer status report (BSR) report based on the determined UL data split ratio, wherein the UE indicates a required amount of UL data in the BSR report after applying the determined UL data split ratio into a current amount of UL data.

15. The method of claim 1, further comprising:
determining a fluctuation in the UL data with respect to the second UL data threshold value based on the monitored throughput UL data;
calculating a third UL data threshold value for adding to the second UL data threshold value based on at least one of determinations of a requirement of the second UL data threshold value, the monitored throughput UL data, or the determined fluctuation; and
adding the calculated third UL data threshold value to the second UL data threshold value.

16. The method of claim 15, wherein further comprising:
receiving an indication to throttle UL data based on determining the fluctuation in the UL data; and
throttling the UL data based on reception of the indication.

17. The method of claim 15, further comprising:
updating UE parameters based on the determining of the fluctuation in the UL data, wherein UE parameters include at least one of a CQI report, a buffer status report (BSR), an available power headroom in a primary leg of one of an NR RLC entity and an LTE RLC entity, a transmission power of the UE, or a Maximum Transmission Power Level (MPTL) in a primary leg.

18. A User Equipment (UE) for controlling Packet Data Convergence Protocol (PDCP) aggregation in a dual connectivity mode, the UE comprising:
memory storing instructions; and
at least one processor, comprising processing circuitry, coupled to the memory, wherein the instructions, when executed by the at least one processor, cause the UE to:
receive a first Uplink (UL) data threshold value from a network;
monitor a throughput of a UL data of the UE and occurrence of at least one UL channel condition;
determine whether to perform a calculation of a second UL data threshold value, based on the occurrence of the at least one UL channel condition;
calculate the second UL data threshold value based on a plurality of network parameters and a plurality of UE parameters, based on determining to perform calculation of the second UL data threshold value, wherein the plurality of network parameters include at least one of network-configured UL parameters, and dynamic UL parameters, and UE parameters is related to at least one of a battery, a temperature and a Tx power of the UE;

compare an amount of the UL data with the second UL data threshold value; and based on the comparing indicating that the amount of the UL data is greater than the second UL data threshold value:

monitor a throughput variation in lower layers until expiration of a time period of a timer;

determine whether the throughput variation is stable after the expiration of the time period of the timer; and enable PDCP aggregation based on determining that the throughput variation is stable.

19. A non-transitory computer readable storage medium storing instructions which, when executed by at least one processor of a user equipment (UE), causes the UE to execute operations, the operations comprising:

receiving a first Uplink (UL) data threshold value from a network;

monitoring a throughput of a UL data of the UE and occurrence of at least one UL channel condition;

determining whether to perform a calculation of a second UL data threshold value based on the occurrence of the at least one UL channel condition;

calculating the second UL data threshold value based on a plurality of network parameters and a plurality of UE parameters, based on determining to perform the calculation of the second UL data threshold value, wherein the plurality of network parameters include at least one of network-configured UL parameters, and dynamic UL parameters, and the plurality of UE parameters is related to at least one of a battery, a temperature and a Tx power of the UE;

comparing an amount of the UL data with the second UL data threshold value; and based on the comparing indicating that the amount of the UL data is greater than the second UL threshold value:

monitoring a throughput variation in lower layers until expiration of a time period of a timer;

determining whether the throughput variation is stable after the expiration of the time period of the timer; and enabling PDCP aggregation based on determining that the throughput variation is stable.

20. The method of claim 1, wherein the at least one UL channel condition comprises one or more of UE transmission power, power headroom availability, UL MCS allocation, UL scheduling fluctuation, UL signal to noise ratio (SNR) calculation, UL bandwidth allocation, a number of UL carriers, average UL, multiple input multiple output (MIMO) allocation, or UL MIMO configuration.

* * * * *